(12) United States Patent
Zhang et al.

(10) Patent No.: US 10,772,044 B2
(45) Date of Patent: Sep. 8, 2020

(54) POWER CONTROL METHOD, NETWORK-SIDE DEVICE, AND USER EQUIPMENT

(71) Applicant: Huawei Technologies Co., Ltd., Shenzhen (CN)

(72) Inventors: Lili Zhang, Beijing (CN); Guorong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 16/094,371

(22) PCT Filed: Apr. 18, 2016

(86) PCT No.: PCT/CN2016/079556
§ 371 (c)(1),
(2) Date: Oct. 17, 2018

(87) PCT Pub. No.: WO2017/181321
PCT Pub. Date: Oct. 26, 2017

(65) Prior Publication Data
US 2019/0191381 A1 Jun. 20, 2019

(51) Int. Cl.
*H04W 52/08* (2009.01)
*H04W 52/24* (2009.01)
(Continued)

(52) U.S. Cl.
CPC ......... *H04W 52/08* (2013.01); *H04W 52/243* (2013.01); *H04W 52/42* (2013.01);
(Continued)

(58) Field of Classification Search
CPC ... H04W 52/08; H04W 52/243; H04W 52/42; H04W 72/044; H04W 52/146; H04W 88/02
See application file for complete search history.

(56) References Cited

U.S. PATENT DOCUMENTS

2012/0289278 A1* 11/2012 Huschke ............. H04W 52/146
455/522
2013/0107828 A1* 5/2013 Dinan ................... H04W 16/06
370/329
(Continued)

FOREIGN PATENT DOCUMENTS

CN 108141825 A 6/2018
WO 2014161175 A1 10/2014
(Continued)

OTHER PUBLICATIONS

Foreign Communication From a Counterpart Application, Chinese Application No. 201680056623.8, Chinese Office Action dated Oct. 21, 2019, 10 pages.
(Continued)

*Primary Examiner* — Duc C Ho
(74) *Attorney, Agent, or Firm* — Conley Rose, P.C.

(57) ABSTRACT

A power control method, a network-side device, and a user equipment (UE), where the power control method includes obtaining, by a network-side device, at least two target subframe sets, and configuring, by the network-side device, power control parameters respectively corresponding to different target subframe sets on a flexible time-frequency resource for UE such that the UE transmits data in subframes in the target subframe sets according to the power control parameters, where the flexible time-frequency resource includes a time domain resource or a frequency domain resource whose transmission direction is configurable.

22 Claims, 10 Drawing Sheets

```
┌─────────────────────────────────────────────────────┐
│                                                     │   ┌─ 601
│  A network-side device obtains at least two target subframe sets
│                                                     │
└─────────────────────────────────────────────────────┘
                            │
                            ▼
┌─────────────────────────────────────────────────────┐
│  The network-side device configures power control parameters
│  respectively corresponding to different target subframe sets on a
│  flexible time-frequency resource for UE, so that the UE transmits   ┌─ 602
│  data in subframes in the target subframe sets according to the
│  power control parameters, where the flexible time-frequency
│  resource includes a time domain resource and/or a frequency
│  domain resource whose transmission direction is configurable
└─────────────────────────────────────────────────────┘
```

(51) Int. Cl.
*H04W 52/42* (2009.01)
*H04W 72/04* (2009.01)
*H04W 52/14* (2009.01)
*H04W 88/02* (2009.01)

(52) U.S. Cl.
CPC ........ *H04W 72/044* (2013.01); *H04W 52/146* (2013.01); *H04W 88/02* (2013.01)

(56) References Cited

U.S. PATENT DOCUMENTS

| | | | |
|---|---|---|---|
| 2013/0114562 A1* | 5/2013 | Seo | H04W 52/146 370/329 |
| 2014/0146696 A1 | 5/2014 | Lin et al. | |
| 2015/0105119 A1* | 4/2015 | Eriksson | H04W 52/386 455/522 |
| 2015/0256320 A1 | 9/2015 | Feng et al. | |
| 2017/0324524 A1* | 11/2017 | Zhou | H04L 5/0007 |
| 2017/0347340 A1* | 11/2017 | Haley | H04L 5/0037 |
| 2019/0191381 A1 | 6/2019 | Zhang et al. | |

FOREIGN PATENT DOCUMENTS

| | | |
|---|---|---|
| WO | 2015018033 A1 | 2/2015 |
| WO | 2015042838 A1 | 4/2015 |

OTHER PUBLICATIONS

"3rd Generation Partnership Project; Technical Specification Group Radio Access Network; Evolved Universal Terrestrial Radio Access (E-UTRA); Physical channels and modulation (Release 13)," 3GPP TS 36.211, V13.1.0, Technical Specification, Mar. 2016, 155 pages.
"3rd Generation Partnership Project; Technical Specification Group Radio Access Network; Evolved Universal Terrestrial Radio (E-UTRA); Physical layer procedures (Release 13)," 3GPP TS 36.213, V13.1.1, Technical Specification, Part 1, Mar. 2016, 6 pages.
"3rd Generation Partnership Project; Technical Specification Group Radio Access Network; Evolved Universal Terrestrial Radio (E-UTRA); Physical layer procedures (Release 13)," 3GPP TS 36.213, V13.1.1, Technical Specification, Part 2, Mar. 2016, 38 pages.
"3rd Generation Partnership Project; Technical Specification Group Radio Access Network; Evolved Universal Terrestrial Radio (E-UTRA); Physical layer procedures (Release 13)," 3GPP TS 36.213, V13.1.1, Technical Specification, Part 3, Mar. 2016, 210 pages.
"3rd Generation Partnership Project; Technical Specification Group Radio Access Network; Evolved Universal Terrestrial Radio (E-UTRA); Physical layer procedures (Release 13)," 3GPP TS 36.213, V13.1.1, Technical Specification, Part 4, Mar. 2016, 79 pages.
"3rd Generation Partnership Project; Technical Specification Group Radio Access Network; Evolved Universal Terrestrial Radio (E-UTRA); Physical layer procedures (Release 13)," 3GPP TS 36.213, V13.1.1, Technical Specification, Part 5, Mar. 2016, 19 pages.
"3rd Generation Partnership Project; Technical Specification Group Radio Access Network; Evolved Universal Terrestrial Radio (E-UTRA); Physical layer procedures (Release 13)," 3GPP TS 36.213, V13.1.1, Technical Specification, Part 6, Mar. 2016, 9 pages.
NSN, et al., "Enhanced UL power control for TDD eIMTA," 3GPP TSG-RAN WG1 Meeting #74, R1-133473, Aug. 19-23, 2013, 2 pages.
ITRI, "UL power control enhancement with dynamic subframe sets for TDD eIMTA," 3GPP TSG RAN WG1 Meeting #75, R1-135410, Nov. 11-15, 2013, 6 pages.
Foreign Communication From a Counterpart Application, PCT Application No. PCT/CN2016/079556, English Translation of International Search Report dated Jan. 10, 2017, 2 pages.
Foreign Communication From a Counterpart Application, PCT Application No. PCT/CN2016/079556, English Translation of Written Opinion dated Jan. 10, 2017, 5 pages.

* cited by examiner

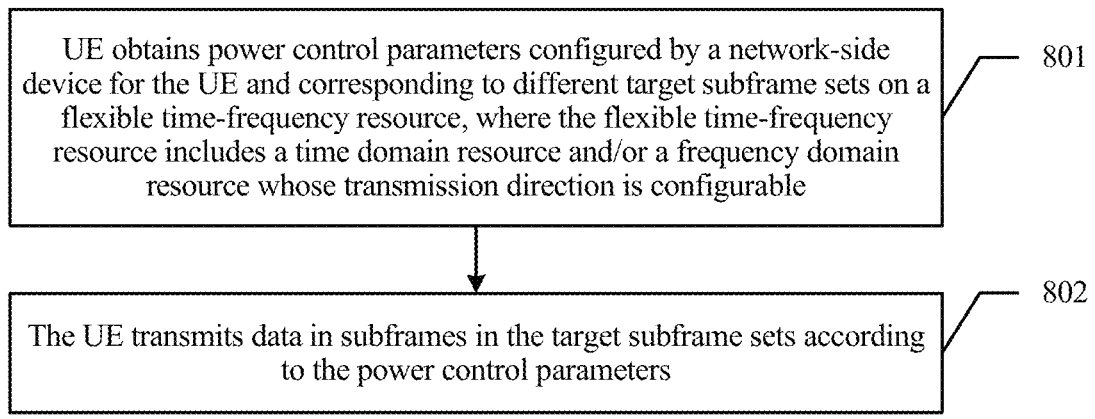
FIG. 8
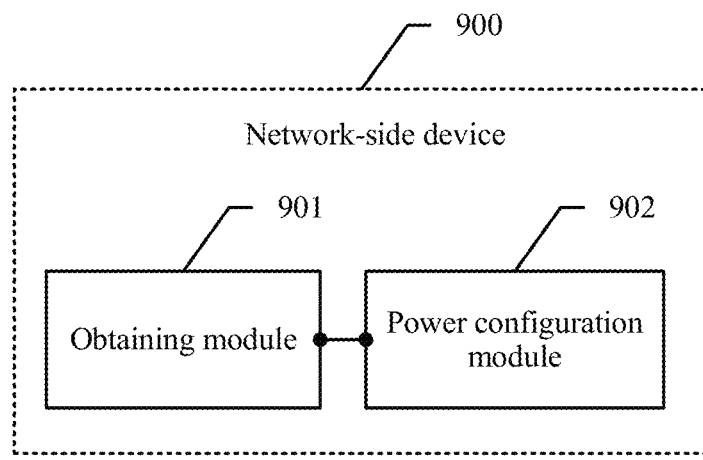
FIG. 9-a

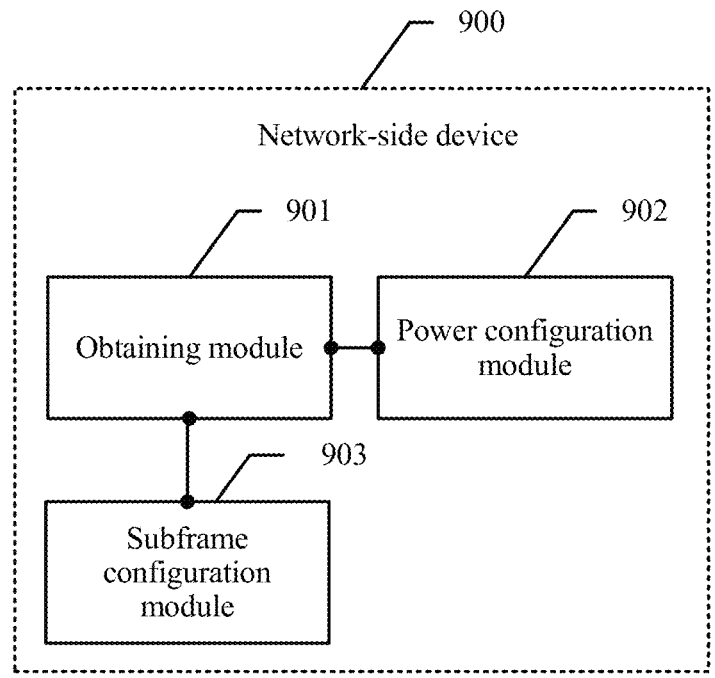
FIG. 9-b
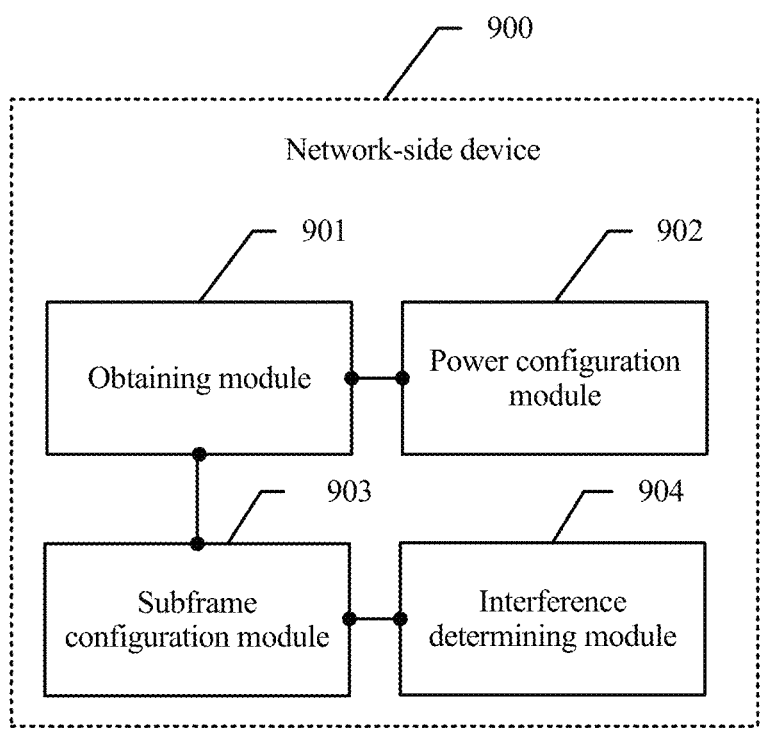
FIG. 9-c

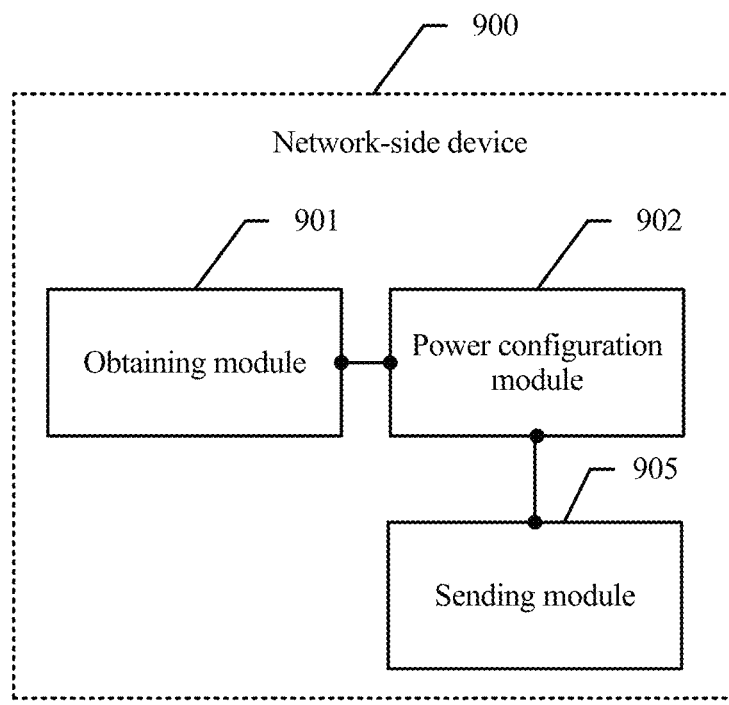
FIG. 9-d
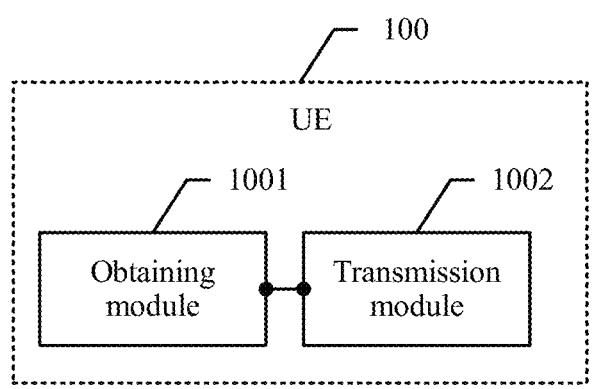
FIG. 10

POWER CONTROL METHOD, NETWORK-SIDE DEVICE, AND USER EQUIPMENT

CROSS-REFERENCE TO RELATED APPLICATIONS

This application is a U.S. National Stage of International Patent Application No. PCT/CN2016/079556 filed on Apr. 18, 2016, which is hereby incorporated by reference in its entirety.

TECHNICAL FIELD

Embodiments of the present invention relate to the field of communications technologies, and in particular, to a power control method, a network-side device, and user equipment.

BACKGROUND

As uplink and downlink services in a communications system are increasingly asymmetric, and a ratio of uplink services to downlink services constantly changes with time, use of fixed paired spectrums and a fixed uplink-downlink timeslot configuration already cannot effectively support dynamic asymmetries of services; in addition, due to explosive growth of a total volume of uplink and downlink services, a half duplex mode already cannot satisfy requirements in some scenarios, and full duplex becomes a possible potential technology. Flexible full duplex fully considers growth of the total service volume and asymmetries, and can adaptively allocate uplink and downlink resources according to distribution of uplink and downlink services, and effectively improve utilization of system resources to satisfy requirements in a future network.

In a flexible frequency band technology, some uplink frequency bands in a frequency division duplex (English: Frequency Division Duplex, FDD for short) system are configured as flexible frequency bands. In an actual application, according to distribution of uplink and downlink services in a network, flexible frequency bands are allocated for uplink transmission or downlink transmission, so that uplink and downlink spectrum resources match uplink and downlink service requirements, thereby improving spectrum utilization. As shown in FIG. 1, when a downlink service volume in a network is higher than an uplink service volume, the network may configure a frequency band f4 that is originally used for uplink transmission as a frequency band used for downlink transmission. In a flexible full duplex technology, time division duplex (English: Time Division Duplex, TDD for short) may be used in the frequency band f4 to perform uplink and downlink service transmission. In a Long Term Evolution (English: Long Term Evolution, LTE for short) system, there are seven different subframe configuration modes in total in time division duplex (English: Time Division Duplex, TDD for short) uplink-downlink configurations. When neighboring cells use different TDD configurations, for flexible FDD full duplex, cross-timeslot interference may be caused between neighboring cells when some uplink (English: uplink, UL for short) frequency bands are configured as downlink (English: Downlink, DL for short) frequency bands according to service requirements.

In the current 3rd Generation Partnership Project (English: 3rd Generation Partnership Project, 3GPP for short), the following mode is used for power control on a physical uplink shared channel (English: Physical Uplink Shared Channel, PUSCH for short):

$$P_{PUSCH,c}(i) = \min\left\{\begin{array}{l}P_{CMAX,c}(i),\\ 10\log_{10}(M_{PUSCH,c}(i)) + P_{O\_PUSCH,c}(j) +\\ \alpha_c(j) \cdot PL_c + \Delta_{TF,c}(i) + f_c(i)\end{array}\right\},$$

where $P_{CMAX,c}(i)$ indicates a maximum power, $M_{PUSCH,c}(i)$ indicates a quantity of physical resource blocks (English: Physical Resource Block, PRB for short), $P_{O\_PUSCH,c}(j)$ and $\alpha_c(j)$ are semi-statically configured parameters, $PL_c$ is a path loss estimated by user equipment (English: User Equipment, UE for short), $\Delta_{TF,c}(i)$ is an incremental value for different modulation and coding schemes (English: Modulation and Coding Scheme, MCS for short), and $f_c(i)$ is a power adjustment value formed by closed-loop power control of a terminal.

When a base station delivers a transmit power control (English: Transmit Power Control, TPC for short) command, there are the following two modes: One is an accumulated mode (English: accumulated mode), the other is an absolute mode (English: absolute mode). The accumulated mode is to increase or decrease progressively to make a change. Changing a transmit power by using a TPC command in the accumulated mode is a slow process, and it is impossible to jump to different interference levels between a flexible subframe and a fixed subframe. The absolute mode is to make a change in a single attempt. The transmit power may be adjusted in a larger range by using a TPC command in the absolute mode. However, in the absolute mode, because an adjusted transmit power cannot be accumulated, a total adjusted power is relatively low. In addition, the absolute mode is not available for power control on a physical uplink control channel (English: Physical Uplink Control Channel, PUCCH for short).

In the foregoing PUSCH power control, $P_{O\_PUSCH,c}(j)$ and $\alpha_c(j)$ are semi-statically configured. A semi-static configuration means that a configuration period is relatively long, and that a value remains unchanged for all subframes. The semi-static configuration is not a dynamic configuration (which has a very short configuration period and occurs very frequently). According to a configured power control mode (accumulated mode or absolute mode), a TPC command related to $f_c(i)$ may adjust the transmit power of the UE within a predefined range. A range of adjustment by the TPC command in the accumulated mode is relatively small, but the adjusted transmit power may be accumulated, and finally, the range may be relatively large.

In an ultra dense network (English: Ultra Dense Network, UDN for short) using flexible full duplex, a main feature of the UDN is: a radius of a typical cell is far less than that of a macro cell, a quantity of UEs connected to each small cell is not large, and network planning and optimization are not considered for deployment of the UDN network. Therefore, uplink-downlink cross-timeslot interference is an obstacle in deploying a flexible full duplex network. In a UDN scenario, interference does not occur merely between neighboring cell clusters, but severer interference occurs between neighboring small cells. In an application scenario in which a flexible full duplex network of an FDD system is deployed, power control needs to be redesigned for UE, because interference levels of different subframes become very complex.

In the prior art, a power control parameter is configured in a semi-static mode, and its value remains unchanged for all subframes. However, if there is cross-timeslot interference between neighboring cells, interference between different uplink subframes may vary. Using a cell as an example, interference received in an uplink subframe by the cell may be uplink interference from a neighboring base station, but interference received in another uplink subframe may be downlink interference from UE within coverage of a neighboring base station. In the foregoing case, if the base station still uses the unified semi-static configuration mode to perform power control, interference differences between different downlink subframes are ignored. When data is transmitted according to such power control, cross-timeslot interference affects effective transmission of data, and reduces an effective transmission rate of data.

SUMMARY

Embodiments of the present invention provide a power control method, a network-side device, and user equipment that are applicable to a flexible full duplex network, to avoid uplink-downlink cross-timeslot interference.

According to a first aspect, an embodiment of the present invention provides a power control method, including:

obtaining, by a network-side device, at least two target subframe sets; and configuring, by the network-side device, power control parameters respectively corresponding to different target subframe sets on a flexible time-frequency resource for user equipment UE, so that the UE transmits data in subframes in the target subframe sets according to the power control parameters, where the flexible time-frequency resource includes a time domain resource and/or a frequency domain resource whose transmission direction is configurable.

With reference to the first aspect, in a first possible implementation of the first aspect, before the obtaining, by a network-side device, at least two target subframe sets, the method further includes:

allocating, by the network-side device according to an uplink-downlink configuration of subframes on the flexible time-frequency resource for a target cell and at least one neighboring cell of the target cell, a subframe whose transmission direction is uplink in the target cell and whose transmission direction is not uniformly uplink in the at least one neighboring cell to a first subframe set, and a subframe whose transmission direction is uniformly uplink in the target cell and the at least one neighboring cell to a second subframe set, where the target subframe sets include the first subframe set and the second subframe set.

With reference to the first possible implementation of the first aspect, in a second possible implementation of the first aspect, the method further includes:

dividing, by the network-side device, the first subframe set into a plurality of subframe subsets, where each subframe subset in the plurality of subframe subsets includes a subframe or subframes with an equal quantity of downlink or uplink transmission directions in the at least one neighboring cell.

With reference to the second possible implementation of the first aspect, in a third possible implementation of the first aspect, the configuring, by the network-side device, power control parameters respectively corresponding to different target subframe sets on a flexible time-frequency resource for user equipment UE includes:

when a target subframe set to which a subframe of the UE belongs is the first subframe set, configuring, by the network-side device, a corresponding power control parameter for the UE according to each subframe subset.

With reference to the third possible implementation of the first aspect, in a fourth possible implementation of the first aspect, the configuring, by the network-side device, a corresponding power control parameter for the UE according to each subframe subset includes:

configuring, by the network-side device, the corresponding power control parameter for the UE according to each subframe subset index or an attribute identifier of each subframe subset.

With reference to the first possible implementation of the first aspect, in a fifth possible implementation of the first aspect, the configuring, by the network-side device, power control parameters respectively corresponding to different target subframe sets on a flexible time-frequency resource for user equipment UE includes:

when a target subframe set to which a subframe of the UE belongs is the first subframe set, configuring, by the network-side device, a corresponding power control parameter for the UE according to each subframe index; or when a target subframe set to which a subframe of the UE belongs is the second subframe set, configuring, by the network-side device, a same power control parameter for a plurality of subframes of the UE.

With reference to the first possible implementation of the first aspect, in a sixth possible implementation of the first aspect, before the allocating, by the network-side device according to an uplink-downlink configuration of subframes on the flexible time-frequency resource for a target cell and at least one neighboring cell of the target cell, a subframe whose transmission direction is uplink in the target cell and whose transmission direction is not uniformly uplink in the at least one neighboring cell to a first subframe set, the method further includes:

determining, by the network-side device, an interference level of a subframe of the UE according to an interference type of mutual interference between the target cell and the at least one neighboring cell; and the configuring, by the network-side device, power control parameters respectively corresponding to different target subframe sets on a flexible time-frequency resource for user equipment UE is specifically:

determining, by the network-side device according to the interference level of the subframe of the UE on the flexible time-frequency resource, power control parameters corresponding to different interference levels.

With reference to the first possible implementation of the first aspect, in a seventh possible implementation of the first aspect, the configuring, by the network-side device, power control parameters respectively corresponding to different target subframe sets on a flexible time-frequency resource for user equipment UE includes:

configuring, by the network-side device, a first power control parameter for the first subframe set, and configuring a second power control parameter for the second subframe set, where the first power control parameter and the second power control parameter are different power control parameters.

With reference to the seventh possible implementation of the first aspect, in an eighth possible implementation of the first aspect, the configuring, by the network-side device, a first power control parameter for the first subframe set, and configuring a second power control parameter for the second subframe set includes:

when a target subframe set to which a subframe of the UE belongs is the first subframe set, configuring, by the network-side device, the first power control parameter for the UE, or when a target subframe set to which a subframe of the UE belongs is the second subframe set, configuring, by the network-side device, the second power control parameter for the UE.

With reference to the first aspect, or the first or the second or the third or the fourth or the fifth or the sixth or the seventh or the eighth possible implementation of the first aspect, in a ninth possible implementation of the first aspect, the power control parameter includes an open-loop power control parameter and/or a closed-loop power control parameter.

With reference to the ninth possible implementation of the first aspect, in a tenth possible implementation of the first aspect, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

With reference to the first aspect, or the first or the second or the third or the fourth or the fifth or the sixth or the seventh or the eighth or the ninth or the tenth possible implementation of the first aspect, in an eleventh possible implementation of the first aspect, the power control parameter includes a configured cell-specific power control parameter and/or a configured UE-specific power control parameter.

With reference to the eleventh possible implementation of the first aspect, in a twelfth possible implementation of the first aspect, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

With reference to the first aspect, or the first or the second or the third or the fourth or the fifth or the sixth or the seventh or the eighth or the ninth or the tenth or the eleventh or the twelfth possible implementation of the first aspect, in a thirteenth possible implementation of the first aspect, the configuring, by the network-side device, power control parameters respectively corresponding to different target subframe sets on a flexible time-frequency resource for user equipment UE includes:

when the UE uses the accumulated mode in the subframes in the target subframe sets, calculating, by the network-side device according to a power control parameter used by the UE in a previous subframe in a corresponding same target subframe set, a power control parameter used by the UE in a current subframe, or calculating, by the network-side device according to a power control parameter used by the UE in a previous subframe in a same subframe subset in a corresponding same target subframe set, a power control parameter used by the UE in a current subframe.

With reference to the first aspect, or the first or the second or the third or the fourth or the fifth or the sixth or the seventh or the eighth or the ninth or the tenth or the eleventh or the twelfth or the thirteenth possible implementation of the first aspect, in a fourteenth possible implementation of the first aspect, the flexible time-frequency resource includes at least one of the following resources: a flexible frequency band, a flexible subband, a flexible subframe, a flexible frame, and a flexible superframe.

With reference to the fourteenth possible implementation of the first aspect, in a fifteenth possible implementation of the first aspect, the flexible frequency band is an uplink UL frequency band in a frequency division duplex FDD system;

the flexible subband is a UL subband in the FDD system;

the flexible subframe is a subframe in a time division duplex TDD system;

the flexible frame is a frame in the TDD system; and the flexible superframe is a superframe in the TDD system.

With reference to the first aspect, or the first or the second or the third or the fourth or the fifth or the sixth or the seventh or the eighth or the ninth or the tenth or the eleventh or the twelfth or the thirteenth or the fourteenth or the fifteenth possible implementation of the first aspect, in a sixteenth possible implementation of the first aspect, after the configuring, by the network-side device, power control parameters respectively corresponding to different target subframe sets on a flexible time-frequency resource for user equipment UE, the method further includes:

sending, by the network-side device, the configured power control parameter to the UE.

With reference to the sixteenth possible implementation of the first aspect, in a seventeenth possible implementation of the first aspect, the sending, by the network-side device, the configured power control parameter to the UE includes:

sending, by the network-side device, the configured power control parameter to the UE by using radio resource control RRC signaling, broadcast signaling, or physical layer signaling.

With reference to the sixteenth possible implementation of the first aspect, in an eighteenth possible implementation of the first aspect, the sending, by the network-side device, the configured power control parameter to the UE includes:

sending, by the network-side device, the configured power control parameter on a specific carrier to the UE.

With reference to the eighteenth possible implementation of the first aspect, in a nineteenth possible implementation of the first aspect, the sending, by the network-side device, the configured power control parameter on a specific carrier to the UE includes:

when the neighboring cell has a same uplink-downlink configuration of subframes on a plurality of carriers, and correspondingly, the target cell has a same uplink-downlink configuration of subframes on the plurality of carriers, determining, by the network-side device, the specific carrier from the plurality of carriers, and sending, on the specific carrier to the UE, the configured power control parameter, and/or a target subframe set or a subframe subset corresponding to the power control parameter, and/or a carrier set or a carrier subset corresponding to the power control parameter.

According to a second aspect, an embodiment of the present invention further provides a power control method, including:

obtaining, by user equipment UE, power control parameters configured by a network-side device for the UE and corresponding to different target subframe sets on a flexible time-frequency resource, where the flexible time-frequency resource includes a time domain resource and/or a frequency domain resource whose transmission direction is configurable; and transmitting, by the UE, data in subframes in the target subframe sets according to the power control parameters.

With reference to the second aspect, in a first possible implementation of the second aspect, the target subframe sets include a first subframe set and a second subframe set, and the first subframe set and the second subframe set are determined by the network-side device according to an uplink-downlink configuration of subframes on the flexible time-frequency resource for a target cell and at least one neighboring cell of the target cell, where the first subframe set includes a subframe whose transmission direction is uplink in the target cell and whose transmission direction is not uniformly uplink in the at least one neighboring cell, and the second subframe set includes a subframe whose transmission direction is uniformly uplink in the target cell and the at least one neighboring cell.

With reference to the second aspect, in a second possible implementation of the second aspect, the obtaining, by user equipment UE, power control parameters configured by a network-side device for the UE and corresponding to different target subframe sets on a flexible time-frequency resource includes:

when a target subframe set to which a subframe of the UE belongs is the first subframe set, determining, by the UE according to a subframe subset to which the subframe of the UE belongs, a power control parameter configured by the network-side device for the UE.

With reference to the second possible implementation of the second aspect, in a third possible implementation of the second aspect, the determining, by the UE according to a subframe subset to which the subframe of the UE belongs, a power control parameter configured by the network-side device for the UE includes:

determining, by the UE according to a subframe subset index or an attribute identifier of the subframe subset to which the subframe of the UE belongs, the power control parameter configured by the network-side device for the UE.

With reference to the second aspect, in a fourth possible implementation of the second aspect, the obtaining, by user equipment UE, power control parameters configured by a network-side device for the UE and corresponding to different target subframe sets on a flexible time-frequency resource includes:

determining, by the UE according to a subframe index of a subframe of the UE, a power control parameter configured by the network-side device for the UE.

With reference to the second aspect, in a fifth possible implementation of the second aspect, the obtaining, by user equipment UE, power control parameters configured by a network-side device for the UE and corresponding to different target subframe sets on a flexible time-frequency resource includes:

determining, by the UE according to an interference level of a subframe of the UE, a power control parameter configured by the network-side device for the UE.

With reference to the second aspect, in a sixth possible implementation of the second aspect, the obtaining, by user equipment UE, power control parameters configured by a network-side device for the UE and corresponding to different target subframe sets on a flexible time-frequency resource includes:

determining, by the UE, whether a target subframe set to which a subframe of the UE belongs is the first subframe set or the second subframe set; and when the target subframe set to which the subframe of the UE belongs is the first subframe set, determining, by the UE, that the network-side device configures a first power control parameter for the UE, or when the target subframe set to which the subframe of the UE belongs is the second subframe set, determining, by the UE, that the network-side device configures a second power control parameter for the UE.

With reference to the second aspect, in a seventh possible implementation of the second aspect, the power control parameter includes an open-loop power control parameter and/or a closed-loop power control parameter.

With reference to the seventh possible implementation of the second aspect, in an eighth possible implementation of the second aspect, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

With reference to the second aspect, or the first or the second or the third or the fourth or the fifth or the sixth or the seventh or the eighth possible implementation of the second aspect, in a ninth possible implementation of the second aspect, the power control parameter includes a configured cell-specific power control parameter and/or a configured UE-specific power control parameter.

With reference to the ninth possible implementation of the second aspect, in a tenth possible implementation of the second aspect, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

With reference to the second aspect, or the first or the second or the third or the fourth or the fifth or the sixth or the seventh or the eighth or the ninth or the tenth possible implementation of the second aspect, in an eleventh possible implementation of the second aspect, the obtaining, by user equipment UE, power control parameters configured by a network-side device for the UE and corresponding to different target subframe sets on a flexible time-frequency resource includes:

when the UE determines to use the accumulated mode in the subframes in the target subframe sets, calculating, by the UE according to a power control parameter used in a previous subframe in a corresponding same target subframe set, a power control parameter used by the UE in a current subframe, or calculating, by the UE according to a power control parameter used in a previous subframe in a same subframe subset in a corresponding same target subframe set, a power control parameter used by the UE in a current subframe.

With reference to the second aspect, or the first or the second or the third or the fourth or the fifth or the sixth or the seventh or the eighth or the ninth or the tenth or the eleventh possible implementation of the second aspect, in a twelfth possible implementation of the second aspect, the flexible time-frequency resource includes at least one of the following resources: a flexible frequency band, a flexible subband, a flexible subframe, a flexible frame, and a flexible superframe.

With reference to the twelfth possible implementation of the second aspect, in a thirteenth possible implementation of the second aspect, the flexible frequency band is an uplink UL frequency band in a frequency division duplex FDD system;

the flexible subband is a UL subband in the FDD system;

the flexible subframe is a subframe in a time division duplex TDD system;

the flexible frame is a frame in the TDD system; and the flexible superframe is a superframe in the TDD system.

With reference to the second aspect, or the first or the second or the third or the fourth or the fifth or the sixth or the seventh or the eighth or the ninth or the tenth or the eleventh or the twelfth or the thirteenth possible implementation of the second aspect, in a fourteenth possible implementation of the second aspect, the obtaining, by user equipment UE, power control parameters configured by a network-side device for the UE and corresponding to different target subframe sets on a flexible time-frequency resource includes:

receiving, by the UE by using radio resource control RRC signaling, broadcast signaling, or physical layer signaling, the power control parameter sent by the network-side device.

With reference to the second aspect, or the first or the second or the third or the fourth or the fifth or the sixth or the seventh or the eighth or the ninth or the tenth or the eleventh or the twelfth or the thirteenth possible implementation of the second aspect, in a fifteenth possible implementation of the second aspect, the obtaining, by user equipment UE, power control parameters configured by a network-side device for the UE and corresponding to different target subframe sets on a flexible time-frequency resource includes:

receiving, by the UE, on a specific carrier, the power control parameter sent by the network-side device.

With reference to the fifteenth possible implementation of the second aspect, in a sixteenth possible implementation of the second aspect, the receiving, by the UE, on a specific carrier, the power control parameter sent by the network-side device includes:

when the neighboring cell has a same uplink-downlink configuration of subframes on a plurality of carriers, and correspondingly, the target cell has a same uplink-downlink configuration of subframes on the plurality of carriers, determining, by the UE, the specific carrier from the plurality of carriers, and receiving, on the specific carrier, the power control parameter, and/or a target subframe set or a subframe subset corresponding to the power control parameter, and/or a carrier set or a carrier subset corresponding to the power control parameter that are/is sent by the network-side device.

According to a third aspect, an embodiment of the present invention provides a network-side device, including:

an obtaining module, configured to obtain at least two target subframe sets; and a power configuration module, configured to configure power control parameters respectively corresponding to different target subframe sets on a flexible time-frequency resource for user equipment UE, so that the UE transmits data in subframes in the target subframe sets according to the power control parameters, where the flexible time-frequency resource includes a time domain resource and/or a frequency domain resource whose transmission direction is configurable.

With reference to the third aspect, in a first possible implementation of the third aspect, the network-side device further includes a subframe configuration module, where before the obtaining module obtains the at least two target subframe sets, the subframe configuration module is configured to allocate, according to an uplink-downlink configuration of subframes on the flexible time-frequency resource for a target cell and at least one neighboring cell of the target cell, a subframe whose transmission direction is uplink in the target cell and whose transmission direction is not uniformly uplink in the at least one neighboring cell to a first subframe set, and a subframe whose transmission direction is uniformly uplink in the target cell and the at least one neighboring cell to a second subframe set, where the target subframe sets include the first subframe set and the second subframe set.

With reference to the first possible implementation of the third aspect, in a second possible implementation of the third aspect, the subframe configuration module is specifically configured to divide the first subframe set into a plurality of subframe subsets, where each subframe subset in the plurality of subframe subsets includes a subframe or subframes with an equal quantity of downlink or uplink transmission directions in the at least one neighboring cell.

With reference to the second possible implementation of the third aspect, in a third possible implementation of the third aspect, the power configuration module is specifically configured to configure a corresponding power control parameter for the UE according to each subframe subset when a target subframe set to which a subframe of the UE belongs is the first subframe set.

With reference to the third possible implementation of the third aspect, in a fourth possible implementation of the third aspect, the power configuration module is specifically configured to configure the corresponding power control parameter for the UE according to each subframe subset index or an attribute identifier of each subframe subset.

With reference to the first possible implementation of the third aspect, in a fifth possible implementation of the third aspect, the power configuration module is specifically configured to: when a target subframe set to which a subframe of the UE belongs is the first subframe set, configure a corresponding power control parameter for the UE according to each subframe index; or when a target subframe set to which a subframe of the UE belongs is the second subframe set, configure a same power control parameter for a plurality of subframes of the UE.

With reference to the first possible implementation of the third aspect, in a sixth possible implementation of the third aspect, the network-side device further includes an interference determining module, configured to determine an interference level of a subframe of the UE according to an interference type of mutual interference between the target cell and the at least one neighboring cell before the subframe configuration module allocates, according to the uplink-downlink configuration of the subframes on the flexible time-frequency resource for the target cell in which the user equipment UE is located and the at least one neighboring cell of the target cell, the subframe whose transmission direction is uplink in the target cell and whose transmission direction is not uniformly uplink in the at least one neighboring cell to the first subframe set; and the power configuration module is specifically configured to determine, according to the interference level of the subframe of the UE on the flexible time-frequency resource, power control parameters corresponding to different interference levels.

With reference to the first possible implementation of the third aspect, in a seventh possible implementation of the third aspect, the power configuration module is specifically configured to configure a first power control parameter for the first subframe set, and configure a second power control parameter for the second subframe set, where the first power control parameter and the second power control parameter are different power control parameters.

With reference to the third aspect, or the first or the second or the third or the fourth or the fifth or the sixth or the seventh possible implementation of the third aspect, in an eighth possible implementation of the third aspect, the power control parameter includes an open-loop power control parameter and/or a closed-loop power control parameter.

With reference to the eighth possible implementation of the third aspect, in a ninth possible implementation of the third aspect, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

With reference to the third aspect, or the first or the second or the third or the fourth or the fifth or the sixth or the seventh or the eighth or the ninth possible implementation of the third aspect, in a tenth possible implementation of the third aspect, the power control parameter includes a configured cell-specific power control parameter and/or a configured UE-specific power control parameter.

With reference to the tenth possible implementation of the third aspect, in an eleventh possible implementation of the third aspect, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

With reference to the third aspect, or the first or the second or the third or the fourth or the fifth or the sixth or the seventh or the eighth or the ninth or the tenth or the eleventh possible implementation of the third aspect, in a twelfth possible implementation of the third aspect, the power configuration module is specifically configured to: when the UE uses the accumulated mode in the subframes in the target subframe sets, calculate, according to a power control parameter used by the UE in a previous subframe in a corresponding same target subframe set, a power control parameter used by the UE in a current subframe, or calculate, according to a power control parameter used by the UE in a previous subframe in a same subframe subset in a corresponding same target subframe set, a power control parameter used by the UE in a current subframe.

With reference to the third aspect, or the first or the second or the third or the fourth or the fifth or the sixth or the seventh or the eighth or the ninth or the tenth or the eleventh or the twelfth possible implementation of the third aspect, in a thirteenth possible implementation of the third aspect, the flexible time-frequency resource includes at least one of the following resources: a flexible frequency band, a flexible subband, a flexible subframe, a flexible frame, and a flexible superframe.

With reference to the third aspect, or the first or the second or the third or the fourth or the fifth or the sixth or the seventh or the eighth or the ninth or the tenth or the eleventh or the twelfth or the thirteenth possible implementation of the third aspect, in a fourteenth possible implementation of the third aspect, the network-side device further includes a sending module, configured to send the configured power control parameter to the UE after the power configuration module configures the power control parameters respectively corresponding to different target subframe sets on the flexible time-frequency resource for the user equipment UE.

With reference to the fourteenth possible implementation of the third aspect, in a fifteenth possible implementation of the third aspect, the sending module is specifically configured to send the configured power control parameter on a specific carrier to the UE.

With reference to the fifteenth possible implementation of the third aspect, in a sixteenth possible implementation of the third aspect, the sending module is specifically configured to: when the neighboring cell has a same uplink-downlink configuration of subframes on a plurality of carriers, and correspondingly, the target cell has a same uplink-downlink configuration of subframes on the plurality of carriers, determine the specific carrier from the plurality of carriers, and send, on the specific carrier to the UE, the configured power control parameter, and/or a target subframe set or a subframe subset corresponding to the power control parameter, and/or a carrier set or a carrier subset corresponding to the power control parameter.

According to a fourth aspect, an embodiment of the present invention further provides user equipment UE, including:

an obtaining module, configured to obtain power control parameters configured by a network-side device for the UE and corresponding to different target subframe sets on a flexible time-frequency resource, where the flexible time-frequency resource includes a time domain resource and/or a frequency domain resource whose transmission direction is configurable; and a transmission module, configured to transmit data in subframes in the target subframe sets according to the power control parameters.

With reference to the fourth aspect, in a first possible implementation of the fourth aspect, the target subframe sets include a first subframe set and a second subframe set, and the first subframe set and the second subframe set are determined by the network-side device according to an uplink-downlink configuration of subframes on the flexible time-frequency resource for a target cell and at least one neighboring cell of the target cell, where the first subframe set includes a subframe whose transmission direction is uplink in the target cell and whose transmission direction is not uniformly uplink in the at least one neighboring cell, and the second subframe set includes a subframe whose transmission direction is uniformly uplink in the target cell and the at least one neighboring cell.

With reference to the fourth aspect, in a second possible implementation of the fourth aspect, when a target subframe set to which a subframe of the UE belongs is the first subframe set, the obtaining module is specifically configured to determine, according to a subframe subset to which the subframe of the UE belongs, a power control parameter configured by the network-side device for the UE.

With reference to the second possible implementation of the fourth aspect, in a third possible implementation of the fourth aspect, the obtaining module is specifically configured to determine, according to a subframe subset index or an attribute identifier of the subframe subset to which the subframe of the UE belongs, the power control parameter configured by the network-side device for the UE.

With reference to the fourth aspect, in a fourth possible implementation of the fourth aspect, the obtaining module is specifically configured to determine, according to a subframe index of a subframe of the UE, a power control parameter configured by the network-side device for the UE.

With reference to the fourth aspect, in a fifth possible implementation of the fourth aspect, the obtaining module is specifically configured to determine, according to an interference level of a subframe of the UE, a power control parameter configured by the network-side device for the UE.

With reference to the fourth aspect, in a sixth possible implementation of the fourth aspect, the obtaining module is specifically configured to: determine whether a target subframe set to which a subframe of the UE belongs is the first subframe set or the second subframe set; and when the target subframe set is the first subframe set, determine that the network-side device configures a first power control parameter for the UE, or when the target subframe set to which the subframe of the UE belongs is the second subframe set, determine that the network-side device configures a second power control parameter for the UE.

With reference to the fourth aspect, in a seventh possible implementation of the fourth aspect, the power control parameter includes an open-loop power control parameter and/or a closed-loop power control parameter.

With reference to the seventh possible implementation of the fourth aspect, in an eighth possible implementation of the fourth aspect, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

With reference to the fourth aspect, or the first or the second or the third or the fourth or the fifth or the sixth or the seventh or the eighth possible implementation of the fourth aspect, in a ninth possible implementation of the fourth aspect, the power control parameter includes a configured cell-specific power control parameter and/or a configured UE-specific power control parameter.

With reference to the ninth possible implementation of the fourth aspect, in a tenth possible implementation of the fourth aspect, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

With reference to the fourth aspect, or the first or the second or the third or the fourth or the fifth or the sixth or the seventh or the eighth or the ninth or the tenth possible implementation of the fourth aspect, in an eleventh possible implementation of the fourth aspect, when the UE determines to use the accumulated mode in the subframes in the target subframe sets, the obtaining module is specifically configured to calculate, according to a power control parameter used in a previous subframe in a corresponding same target subframe set, a power control parameter used by the UE in a current subframe, or calculate, according to a power control parameter used in a previous subframe in a same subframe subset in a corresponding same target subframe set, a power control parameter used by the UE in a current subframe.

With reference to the fourth aspect, or the first or the second or the third or the fourth or the fifth or the sixth or the seventh or the eighth or the ninth or the tenth or the eleventh possible implementation of the fourth aspect, in a twelfth possible implementation of the fourth aspect, the flexible time-frequency resource includes at least one of the following resources: a flexible frequency band, a flexible subband, a flexible subframe, a flexible frame, and a flexible superframe.

With reference to the fourth aspect, or the first or the second or the third or the fourth or the fifth or the sixth or the seventh or the eighth or the ninth or the tenth or the eleventh or the twelfth possible implementation of the fourth aspect, in a thirteenth possible implementation of the fourth aspect, the obtaining module is specifically configured to receive, on a specific carrier, the power control parameter sent by the network-side device.

With reference to the thirteenth possible implementation of the fourth aspect, in a fourteenth possible implementation of the fourth aspect, the obtaining module is specifically configured to: when the neighboring cell has a same uplink-downlink configuration of subframes on a plurality of carriers, and correspondingly, the target cell has a same uplink-downlink configuration of subframes on the plurality of carriers, determine the specific carrier from the plurality of carriers, and receive, on the specific carrier, the power control parameter, and/or a target subframe set or a subframe subset corresponding to the power control parameter, and/or a carrier set or a carrier subset corresponding to the power control parameter that are/is sent by the network-side device.

It can be seen from the foregoing technical solutions that the embodiments of the present invention have the following advantages:

In the embodiments of the present invention, first, the network-side device obtains the at least two target subframe sets; and then the network-side device configures the power control parameters respectively corresponding to different target subframe sets on the flexible time-frequency resource for the user equipment UE, so that the UE transmits the data in the subframes in the target subframe sets according to the power control parameters configured by the network-side device, where the flexible time-frequency resource includes the time domain resource and/or the frequency domain resource whose transmission direction is configurable. Because the network-side device in the embodiments of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by the embodiments of the present invention is applicable to a flexible full duplex network, to avoid uplink-downlink cross-timeslot interference caused by power control parameters that are configured in a semi-static mode.

BRIEF DESCRIPTION OF DRAWINGS

FIG. 8 is a schematic block flowchart of another power control method according to an embodiment of the present invention;

FIG. 9-*a* is a schematic structural diagram of a network-side device according to an embodiment of the present invention;

FIG. 9-*b* is a schematic structural diagram of another network-side device according to an embodiment of the present invention;

FIG. 9-*c* is a schematic structural diagram of another network-side device according to an embodiment of the present invention;

FIG. 9-*d* is a schematic structural diagram of another network-side device according to an embodiment of the present invention;

FIG. 10 is a schematic structural diagram of UE according to an embodiment of the present invention;

DESCRIPTION OF EMBODIMENTS

Embodiments of the present invention provide a power control method, a network-side device, and user equipment that are applicable to a flexible full duplex network, to avoid uplink-downlink cross-timeslot interference.

To make the invention objectives, features, and advantages of the present invention clearer and more comprehensible, the following clearly and completely describes the technical solutions in the embodiments of the present invention with reference to the accompanying drawings in the embodiments of the present invention. Apparently, the embodiments described in the following are merely a part rather than all of the embodiments of the present invention. All other embodiments obtained by persons skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

The technical solutions in the embodiments of the present invention may be applied to various communications systems, such as: a Global System for Mobile Communications (Global System for Mobile communications, GSM), a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, a Universal Mobile Telecommunications System (Universal Mobile Telecommunications System, UMTS), a Worldwide Interoperability for Microwave Access (Worldwide Interoperability for Microwave Access, WiMAX) communications system, or a future 5G system.

Figure 2:
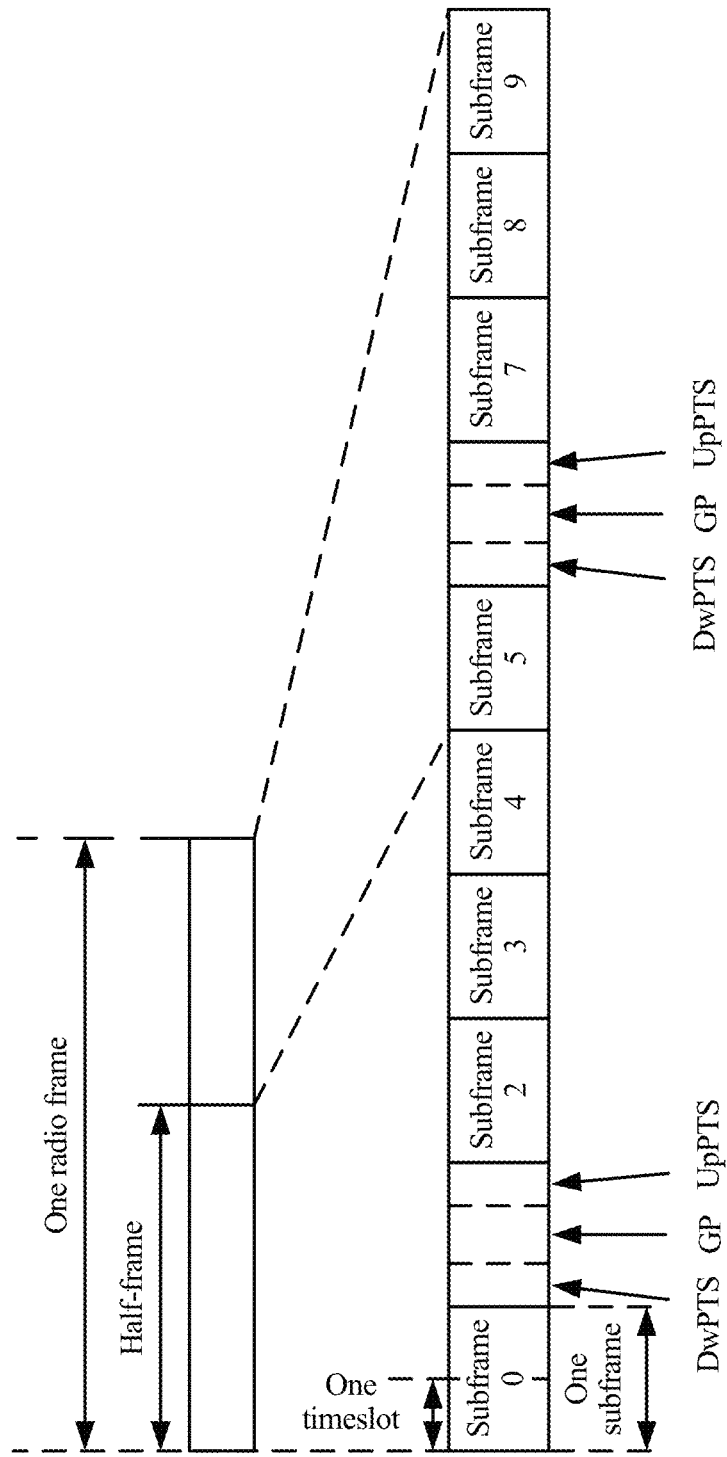
FIG. 2 is a schematic structural diagram of a TDD system according to an embodiment of the present invention.

In an LTE system, a frame structure of a TDD system is shown in FIG. 2. Duration of a radio frame is 10 ms. The radio frame includes two 5 ms half-frames. Each half-frame includes special subframes and normal subframes, five subframes in total, and duration of each subframe is 1 ms. A special subframe includes a downlink pilot timeslot (Downlink Pilot Slot, DwPTS) used for downlink transmission, an uplink-downlink guard period (Guard Period, GP), and an uplink pilot timeslot (Uplink Pilot Slot, UpPTS) used for uplink transmission. The normal subframes include uplink subframes and downlink subframes, used for transmitting an uplink/downlink control channel, service data, and the like. In LTE TDD, different uplink-downlink time configurations are supported, and the uplink-downlink time configurations may be adjusted according to different service types, to satisfy asymmetric uplink/downlink service requirements.

Uplink-downlink configurations of subframes supported in the foregoing frame structure are shown in the following Table 1. In 3GPP TS 36.211, seven uplink-downlink configurations are specified, as shown in the uplink-downlink configuration table in the following Table 1:

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D indicates a subframe used for downlink transmission, U indicates a subframe used for uplink transmission, and S indicates a special subframe. As can be seen from Table 1, a subframe 0 and a subframe 5 are always used for downlink transmission, a subframe 1 always transmits a special subframe, and a subframe 2 is always used for uplink transmission. Therefore, the subframes 0, 1, 2, and 5 may be referred to as fixed subframes, and remaining subframes are referred to as flexible subframes. In a specific implementation, flexible subframes and fixed subframes may be changed according to different uplink-downlink configurations of subframes.

Figure 1:
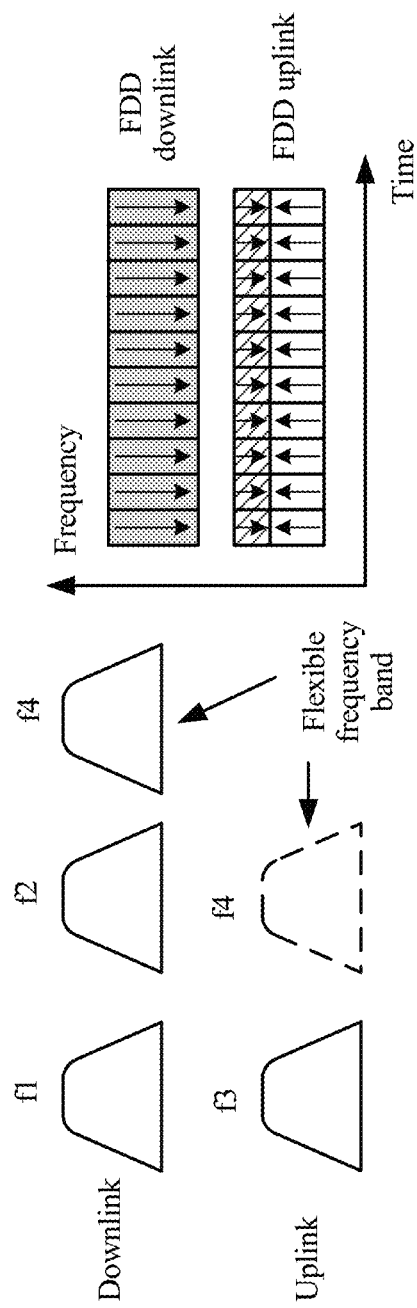
FIG. 1 is a schematic diagram of flexible frequency bands configured in the prior art.
Figure 3:
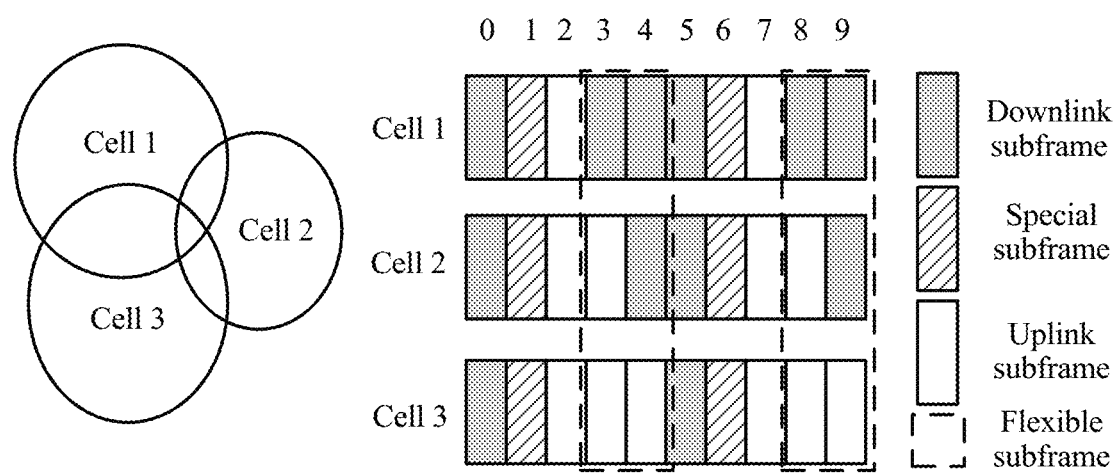
FIG. 3 is a schematic diagram of neighboring cells using different uplink-downlink configurations of subframes according to an embodiment of the present invention.

FIG. 3 is a schematic diagram of neighboring cells using different uplink-downlink configurations of subframes. As shown in FIG. 3, a cell 1, a cell 2, and a cell 3 are neighboring cells. In a time period, the three cells respectively use, in a frequency band f4 as shown in FIG. 1, different uplink-downlink configurations of subframes as shown in FIG. 3. The cell 1 uses a configuration 2, the cell 2 uses a configuration 1, and the cell 3 uses a configuration 0. In this case, the subframes 0, 1, 2, 5, 6, and 7 may be referred to as fixed subframes, and the subframes 3, 4, 8, and 9 may be referred to as flexible subframes. Due to the different uplink-downlink configurations of subframes, flexible subframes may generate cross-timeslot interference. Using the cell 1 as an example, the cell 1 may receive, in the downlink subframe 3 and the downlink subframe 8, uplink interference from UEs of the cell 2 and the cell 3, and receive, in the downlink subframe 4 and the downlink subframe 9, downlink interference from an eNB of the cell 2 and uplink interference from UE of the cell 3. In other words, for the cell 1, interference received in the subframes 3 and 8 is different from interference received in the subframes 4 and 9. For the foregoing case, in the prior art, a power control parameter is configured in a semi-static mode, and a value thereof remains unchanged for all subframes. However, if cross-timeslot interference exists between neighboring cells, interference between different uplink subframes may vary.

When deployment of a flexible full duplex FDD network is considered, flexible configurations may be used in a plurality of UL frequency bands. For a specific frequency band, if each cell selects one TDD configuration from seven defined TDD configuration modes, there is no interference problem in uplink-downlink switching for the subframes 0, 1, 2, and 5, because all the subframes have fixed directions in any defined TDD configuration. For other subframes, their directions may be changed according to the TDD configurations. In this case, cross-timeslot interference may exist, depending on the TDD configurations used by the neighboring cells.

For a specific frequency band, in a time domain, subframes having fixed directions, such as the subframe 0, the subframe 1, the subframe 2, and the subframe 5, may be referred to as fixed frequency bands or fixed subframes, and other subframes are referred to as flexible frequency bands or flexible subframes. Fixed frequency bands and flexible frequency bands may be changed according to TDD configurations that are allowed to be used. Likewise, similar changes may also be made to fixed subframes and flexible subframes. For another example, if a network supports only TDD configurations 1 and 2, subframes 0, 1, 2, 4, 5, 6, 7, and 9 are all fixed frequency bands or fixed subframes, but subframes 3 and 8 are flexible frequency bands or flexible subframes and are set to UL in the TDD configuration 1 and to DL in the TDD configuration 2.

In a frequency domain, the following two cases mainly exist: 1. Flexible TDD can be used for a whole specific UL frequency band. 2. For flexible full duplex in the frequency domain, some PRBs in some subframes in a UL frequency band may be set to DL frequency bands in granularities of subframes, radio frames, or superframes. If a whole UL frequency band in a frequency band is set to a DL frequency band, or a whole PRB in some subbands in a specific frequency band is set to a DL frequency band, whatever granularity (such as subframes, radio frames, or superframes) is used in the time domain, flexible full duplex may be further used from a perspective of a frequency band or a subband. In the embodiments of the present invention, a power control parameter is configured for an enhanced power control mechanism in a flexible full duplex system, so that a transmit power can be set for UE in the flexible full duplex system more flexibly and efficiently.

Figure 4:
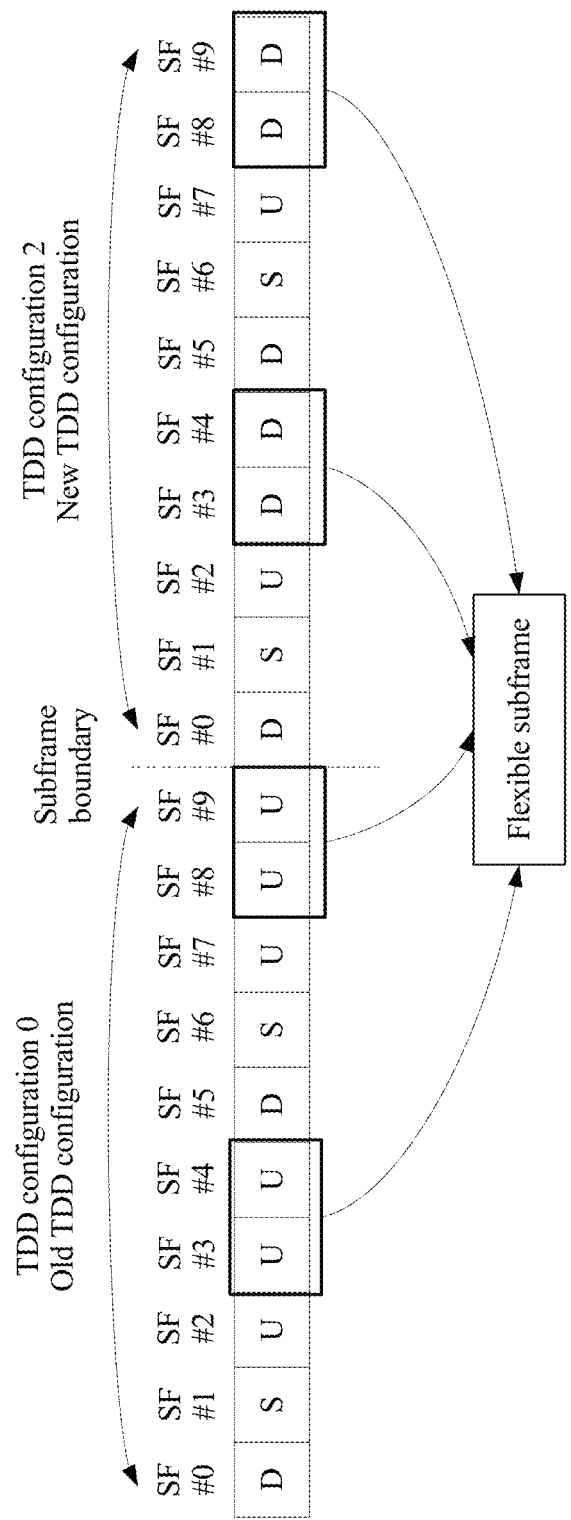
FIG. 4 is a schematic diagram of a configuration of flexible subframes and fixed subframes in a flexible full duplex enhanced scenario according to an embodiment of the present invention.

For a specific frequency band or subband, when a TDD configuration is changed dynamically to accommodate service changes of different UEs, consequentially, there are two types of subframes in a radio frame: fixed subframes and flexible subframes, as shown in FIG. 4.

FIG. 4 is a schematic diagram of a configuration of flexible subframes and fixed subframes in a flexible full duplex enhanced scenario according to an embodiment of the present invention. In flexible full duplex, subframes whose directions can be changed are referred to as flexible subframes, for example, subframes #3, #4, #8, and #9 in FIG. 4. An old TDD configuration (TDD configuration 0) and a new TDD configuration (TDD configuration 2) are separated by a subframe boundary. In the TDD configuration 0, the subframes #3, #4, #8, and #9 are configured to uplink "U"; in the TDD configuration 1, the subframes #3, #4, #8, and #9 are configured to uplink "D". In this case, transmission directions of the subframes #3, #4, #8, and #9 are configurable, and therefore referred to as flexible subframes. The subframes whose directions are not changed are referred to as fixed subframes. In a multi-cell scenario, because TDD configurations are changed dynamically in neighboring cells, the TDD configurations are different, and interference states of flexible subframes and fixed subframes may vary greatly. For fixed subframes, because subframe directions in neighboring cells are the same, interference levels of the fixed subframes are stable. This is similar to that in a conventional LTE TDD/FDD network. However, for a flexible subframe, because cross-timeslot interference may exist, an interference level is far higher than that of a fixed subframe. In addition, in flexible subframes, interference levels are also different, because interference may be interference from DL to UL, or interference from UL to DL, and a neighboring cell as an interference source may also change dynamically.

Figure 5:
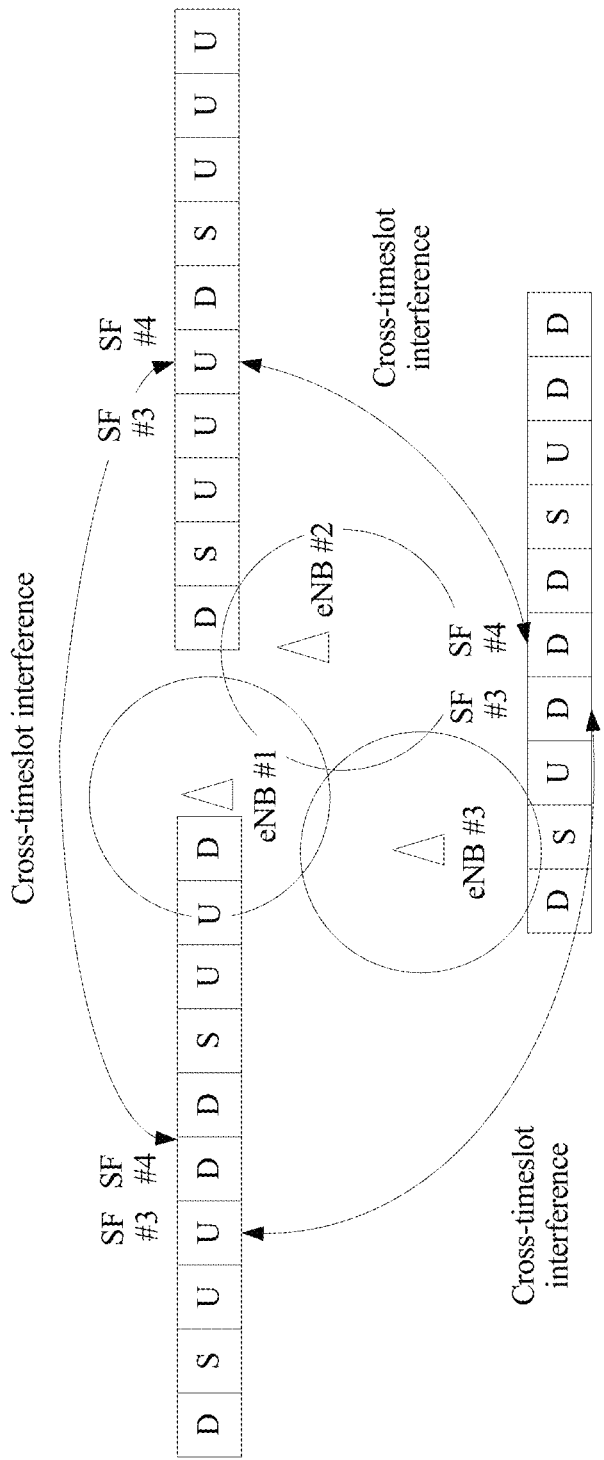
FIG. 5 is a schematic diagram of an application scenario in which cross-timeslot interference is generated between neighboring cells according to an embodiment of the present invention.

Referring to FIG. 5, FIG. 5 is a schematic diagram of an application scenario in which cross-timeslot interference is generated between neighboring cells according to an embodiment of the present invention. As can be seen from FIG. 5, for example, for an eNB #1, subframes #3 and #4 are flexible subframes. Because cross-timeslot interference may be generated, interference levels of the subframes 3 and 4 are different from interference levels of other subframes of the eNB #1. In addition, because the subframe #3 receives interference from a DL subframe, and the subframe #4 receives interference from a UL subframe, interference states of the subframe #3 and the subframe #4 vary greatly.

As can be learned from the foregoing analysis, varying interference differences between flexible frequency bands/subbands/subframes and fixed frequency bands/subbands/subframes and even between flexible frequency bands/subbands/subframes may cause a great challenge to power control of UE. A power control process defined in a current specification possibly cannot adjust the interference difference in the flexible full duplex network. In the current power control process, jumping interference levels between flexible frequency bands/subbands/subframes and fixed frequency bands/subbands/subframes and between flexible frequency bands/subbands/subframes cannot be processed properly.

Figure 6:
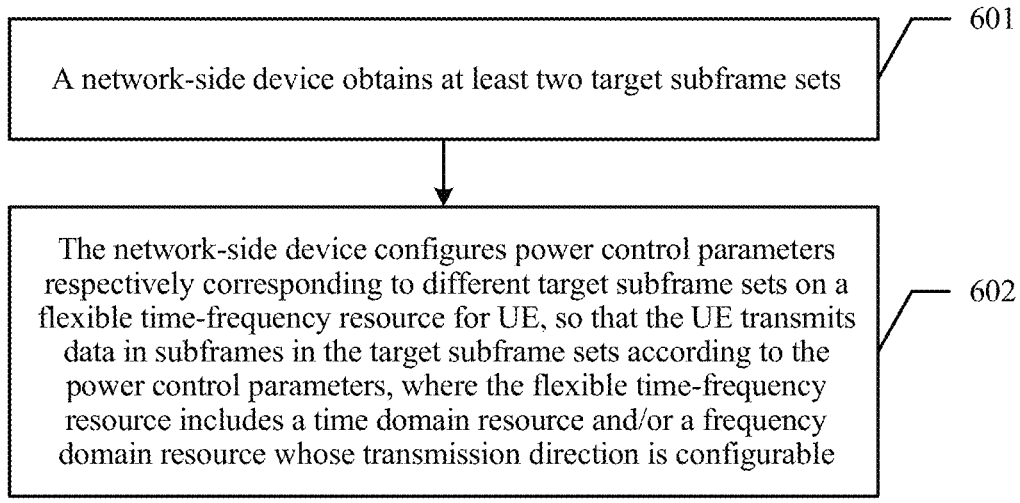
FIG. 6 is a schematic block flowchart of a power control method according to an embodiment of the present invention.

To resolve the foregoing problem, an embodiment of the present invention provides a new power control method. The following describes the power control method in detail in this embodiment of the present invention. FIG. 6 is a schematic flowchart of the power control method according to this embodiment of the present invention. Specifically, the method may be applied to a scenario in which neighboring cells use uplink-downlink configurations of subframes as shown in FIG. 3. However, this is not limited in this document. Detailed descriptions are hereinafter provided separately. First, the power control method provided by this embodiment of the present invention is described from a perspective of a network-side device. Referring to FIG. 6, the power control method provided by this embodiment of the present invention may include the following steps.

601. A network-side device obtains at least two target subframe sets.

In this embodiment of the present invention, the network-side device is a main device for power control. The network-side device may perform communication with a plurality of user equipments in a target cell, so that the network-side device may configure, for the plurality of user equipments in the target cell, power control parameter values required by the plurality of user equipments. The network-side device first obtains the at least two target subframe sets. In this embodiment of the present invention, the network-side device determines a plurality of target subframe sets. Each target subframe set includes at least one subframe. For two or more different target subframe sets, each target subframe set includes subframes that are not completely the same, or includes completely different subframes. For example, there are three subframes in total: a subframe A, a subframe B, and a subframe C; a target subframe set 1 includes the subframe A and the subframe B; a target subframe set 2 includes the subframe A and the subframe C; and a target subframe set 3 includes the subframe A, the subframe B, and the subframe C.

It should be noted that, in this embodiment of the present invention, the network-side device may be a base transceiver station (Base Transceiver Station, BTS) in a GSM system or a Code Division Multiple Access (Code Division Multiple Access, CDMA) system, or may be a NodeB (NodeB, NB) in a WCDMA system, or may be an eNB in an LTE system, or may be a network-side device in a future 5G network. This is not limited in the present invention.

602. The network-side device configures power control parameters respectively corresponding to different target subframe sets on a flexible time-frequency resource for UE, so that the UE transmits data in subframes in the target subframe sets according to the power control parameters, where the flexible time-frequency resource includes a time domain resource and/or a frequency domain resource whose transmission direction is configurable.

In this embodiment of the present invention, after the network-side device obtains a plurality of target subframe sets in step 601, in an application scenario of a flexible time-frequency resource, as can be learned from the prior art, the network-side device configures a power control parameter in a semi-static mode and keeps a value thereof unchanged for all subframes. However, if cross-timeslot interference exists between neighboring cells, interference between different uplink subframes may vary. Different from the prior art, in this embodiment of the present invention, the network-side device configures power control parameters corresponding to different target subframe sets for the UE. To be specific, the network-side device obtains a plurality of target subframe sets, and the network-side device configures a corresponding power control parameter for each target subframe set on the flexible time-frequency resource. When subframes of the UE belong to different target subframe sets, the UE may determine, according to a power control parameter corresponding to a target subframe set, a power control parameter that should be used by the UE in a current subframe. In this embodiment of the present invention, the network-side device configures corresponding power control parameters for different target subframe sets on the flexible time-frequency resource, instead of using a same power control parameter for all subframes. When a target subframe set to which a subframe of the UE belongs changes, the UE also updates the power control parameter according to the change of the target subframe set on the flexible time-frequency resource, so that the updated power control parameter can be applied to current data transmission. In this way, uplink-downlink cross-timeslot interference is avoided.

The flexible time-frequency resource in this embodiment of the present invention includes the time domain resource and/or the frequency domain resource whose transmission direction is configurable. In other words, in this embodiment of the present invention, when the transmission direction of the time domain resource is configurable, the time domain resource becomes a flexible time domain resource. In this embodiment of the present invention, when the transmission direction of the frequency domain resource is configurable, the frequency domain resource becomes a flexible frequency domain resource. In a specific application of the flexible time-frequency resource, the flexible time-frequency resource includes at least one of the following resources: a flexible frequency band, a flexible subband, a flexible subframe, a flexible frame, and a flexible superframe. The flexible frequency band is a frequency band whose transmission direction is configurable; the flexible subband is a subband whose transmission direction is configurable; the flexible subframe is a subframe whose transmission direction is configurable; the flexible frame is a frame whose transmission direction is configurable; and the flexible superframe is a superframe (English: super frame) whose transmission direction is configurable. Generally, a superframe is a combination of a plurality of frames. In some embodiments of the present invention, the flexible frequency band is a UL frequency band in an FDD system; the flexible subband is a UL subband in the FDD system; the flexible subframe is a subframe in a TDD system; the flexible frame is a frame in the TDD system; and the flexible superframe is a superframe in the TDD system. For example, some uplink frequency bands in the FDD system are configured as "flexible frequency bands", and all the frequency bands may be changed into downlink frequency bands, or uplink/downlink service transmission may be performed in the frequency bands by using TDD. The flexible frequency band is a frequency band whose transmission direction is configurable, for example, may be a frequency band f4 shown in FIG. 1. The network-side device may perform a unified uplink-downlink configuration of subframes for the frequency band f4 in a time period, or may perform a unified uplink-downlink configuration of subframes for some subbands in the frequency band f4.

In some embodiments of the present invention, the power control parameter configured by the network side in step 602 includes an open-loop power control parameter and/or a closed-loop power control parameter. Specifically, it may be determined, with reference to an application scenario, that the network-side device configures open-loop power control parameters corresponding to different target subframe sets for the UE, or that the network-side device configures closed-loop power control parameters corresponding to different target subframe sets for the UE. Specifically, in some embodiments of the present invention, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

In other embodiments of the present invention, the power control parameter configured by the network side in step 602 includes a configured cell-specific power control parameter and/or a configured UE-specific power control parameter. In other words, in this embodiment of the present invention, when the network-side device configures power control parameters for different target subframe sets of the UE in step 602, the power control parameters may be specially configured for a specific cell or specially configured for specific UE. For example, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

As can be learned from the descriptions of the examples of the present invention in the foregoing embodiment, first, the network-side device obtains the at least two target subframe sets; and then the network-side device configures the power control parameters respectively corresponding to different target subframe sets on the flexible time-frequency resource for the UE, so that the UE transmits the data in the subframes in the target subframe sets according to the power control parameters configured by the network-side device, where the flexible time-frequency resource includes the time domain resource and/or the frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

Figure 7:
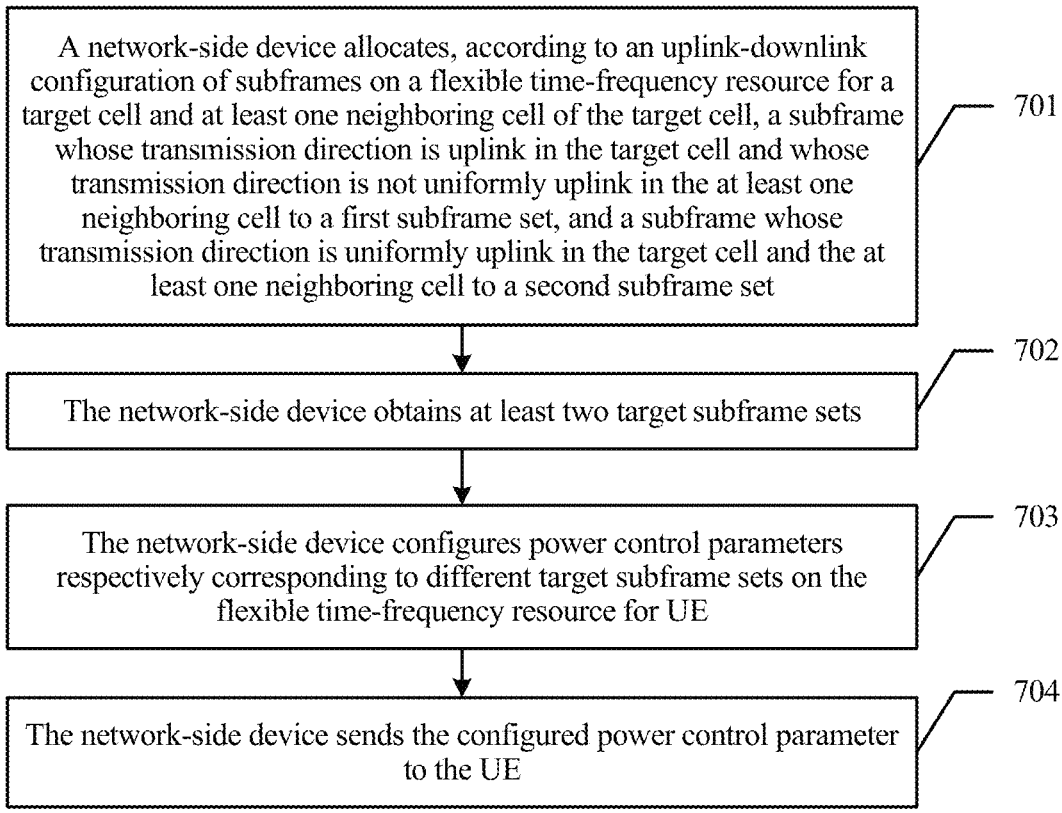
FIG. 7 is a schematic block flowchart of another power control method according to an embodiment of the present invention.

The following uses another embodiment to describe in detail a power control method provided by the present invention. Referring to FIG. 7, the power control method provided by this embodiment of the present invention may include the following steps.

701. A network-side device allocates, according to an uplink-downlink configuration of subframes on a flexible time-frequency resource for a target cell and at least one neighboring cell of the target cell, a subframe whose transmission direction is uplink in the target cell and whose transmission direction is not uniformly uplink in the at least one neighboring cell to a first subframe set, and a subframe whose transmission direction is uniformly uplink in the target cell and the at least one neighboring cell to a second subframe set.

Specifically, the network-side device groups subframes whose transmission directions are uplink in the target cell into the first subframe set and the second subframe set. The first subframe set includes a subframe whose transmission direction in the neighboring cell is not uniformly uplink. In other words, if only one neighboring cell exists, a transmission direction of a subframe that belongs to the first subframe set is uplink in the neighboring cell; or if more than one neighboring cell exists, a transmission direction of a subframe that belongs to the first subframe set may be uplink in one neighboring cell and may be uplink in another neighboring cell. The second subframe set includes a subframe whose transmission direction is uniformly uplink in the neighboring cell. That is, the transmission direction of the subframe that belongs to the second subframe set is uniformly uplink in all neighboring cells. For example, according to transmission directions of subframes in the neighboring cells, the network-side device may group the subframes 3, 4, 8, and 9 shown in FIG. 1 into the first subframe set, marked as S1={3, 4, 8, 9}, and group the subframes 0 and 5 into the second subframe set, marked as S2={0, 5}.

Optionally, in an embodiment, the power control method provided by this embodiment of the present invention may further include the following step.

A1. The network-side device divides the first subframe set into a plurality of subframe subsets, where each subframe subset in the plurality of subframe subsets includes a subframe or subframes with an equal quantity of downlink or uplink transmission directions in the at least one neighboring cell. That is, the network-side device may further divide the first subframe set. For example, for S1={3, 4, 8, 9}, transmission directions of the subframe 3 and the subframe 8 are both uplink in two neighboring cells; and transmission directions of the subframe 4 and the subframe 9 are downlink in one of the two neighboring cells, and uplink in another neighboring cell. In this case, the subframe 3 and the subframe 8 may receive less interference, and the subframe 4 and the subframe 9 may receive more interference. Therefore, the subframe 4 and the subframe 9 may be grouped into one subframe subset, expressed as S1.1={4, 9}, and the subframe 3 and the subframe 8 are grouped into another subframe subset, expressed as S1.2={3, 8}. It should be understood that, in this embodiment of the present invention, UE may be UE at a cell edge. However, this is not limited in the present invention.

702. The network-side device obtains at least two target subframe sets.

In this embodiment of the present invention, the network-side device may perform communication with a plurality of user equipments in the target cell, so that the network-side device may configure, for the plurality of user equipments in the target cell, power control parameter values required by the plurality of user equipments. The network-side device first obtains the at least two target subframe sets. According to the description about step 701, the at least two target subframe sets obtained by the network-side device include the first subframe set and the second subframe set.

703. The network-side device configures power control parameters respectively corresponding to different target subframe sets on the flexible time-frequency resource for UE.

In this embodiment of the present invention, the network-side device configures power control parameters corresponding to different target subframe sets for the UE. To be specific, the network-side device obtains a plurality of target subframe sets, and the network-side device configures a corresponding power control parameter for each target subframe set on the flexible time-frequency resource. When subframes of the UE belong to different target subframe sets, the UE may determine, according to a power control parameter corresponding to a target subframe set, a power control parameter that should be used by the UE in a current subframe. In this embodiment of the present invention, the network-side device configures corresponding power control parameters for different target subframe sets on the flexible time-frequency resource, instead of using a same power control parameter for all subframes. When a target subframe set to which a subframe of the UE belongs changes, the UE also updates the power control parameter according to the change of the target subframe set on the flexible time-frequency resource, so that the updated power control parameter can be applied to current data transmission. In this way, uplink-downlink cross-timeslot interference is avoided.

In some embodiments of the present invention, in the application scenario of step A1 in the foregoing embodiment, that the network-side device configures power control parameters respectively corresponding to different target subframe sets on the flexible time-frequency resource for UE in step 703 may specifically include the following step.

B1. When a target subframe set to which a subframe of the UE belongs is the first subframe set, the network-side device configures a corresponding power control parameter for the UE according to each subframe subset.

In the application scenario shown in step B1, when the target subframe set to which the subframe of the UE belongs is the first subframe set, the first subframe set is divided into a plurality of subframe subsets, and the network-side device may configure corresponding power control parameters for the UE according to the subframe subsets. For example, for each subframe subset, the network-side device sets a power control parameter for the subframe subset. When the UE determines a subframe subset to which the subframe of the UE belongs, a power control parameter that may be used by the UE in the current subframe may be determined.

Further, in some embodiments of the present invention, that the network-side device configures a corresponding power control parameter for the UE according to each subframe subset in step B1 may specifically include the following step.

B11. The network-side device configures the corresponding power control parameter for the UE according to each subframe subset index or an attribute identifier of each subframe subset.

With respect to division of the first subframe set by the network-side device, after the plurality of subframe subsets are obtained, a corresponding index is configured for each subframe subset, or an attribute identifier is set for each subframe subset. The network-side device may configure the power control parameter according to the subframe subset index or the attribute identifier of the subframe subset. When the UE determines the subframe subset to which the subframe of the UE belongs, the power control parameter that may be used by the UE in the current subframe may be determined according to the subframe subset index or the attribute identifier of the subframe subset.

In some embodiments of the present invention, that the network-side device configures power control parameters respectively corresponding to different target subframe sets on the flexible time-frequency resource for UE in step 703 may specifically include the following step.

C1. When a target subframe set to which a subframe of the UE belongs is the first subframe set, the network-side device configures a corresponding power control parameter for the UE according to each subframe index; or C2. When a target subframe set to which a subframe of the UE belongs is the second subframe set, the network-side device configures a same power control parameter for a plurality of subframes of the UE.

Specifically, in the application scenario shown in step C1 and step C2, for the first subframe set, the network-side device configures a corresponding power control parameter for each subframe index. As can be learned from the description about the first subframe set, the first subframe set includes a flexible frequency band/subband/subframe, and therefore, each subframe index needs to correspond to a power control parameter. However, for the second subframe set, as can be learned from the description about the second subframe set, the second subframe set includes a fixed frequency band/subband/subframe, and therefore, a same power control parameter may be configured for a plurality of subframes.

In some embodiments of the present invention, before the network-side device allocates, according to the uplink-downlink configuration of subframes on the flexible time-frequency resource for the target cell and at least one neighboring cell of the target cell, the subframe whose transmission direction is uplink in the target cell and whose transmission direction is not uniformly uplink in the at least one neighboring cell to the first subframe set in step 701, the power control method provided by this embodiment of the present invention may further include the following step.

D1. The network-side device determines an interference level of a subframe of the UE according to an interference type of mutual interference between the target cell and the at least one neighboring cell.

The interference level of the subframe of the UE may be a U-U-U interference group, a U-U-D interference group, and a U-D-D interference group. This is related to a matched interference type in an ambient environment. "U" indicates uplink interference, and "D" indicates downlink interference. Therefore, the interference level of the subframe of the UE may be determined according to the interference type of mutual interference between the target cell and the neighboring cell.

If the interference level of the subframe of the UE is determined, in some embodiments of the present invention, that the network-side device configures power control parameters respectively corresponding to different target subframe sets on the flexible time-frequency resource for UE in step 703 may specifically include the following step.

E1. The network-side device determines, according to the interference level of the subframe of the UE on the flexible time-frequency resource, power control parameters corresponding to different interference levels.

For example, corresponding power control parameters are set for different interference levels. When the UE determines the interference level of the subframe of the UE, the UE may determine, according to the interference level, the power control parameter that may be used by the UE in the current subframe.

In some embodiments of the present invention, that the network-side device configures power control parameters respectively corresponding to different target subframe sets on the flexible time-frequency resource for UE in step 703 may specifically include the following step.

F1. The network-side device configures a first power control parameter for the first subframe set, and configures a second power control parameter for the second subframe set, where the first power control parameter and the second power control parameter are different power control parameters.

Specifically, according to the description about step 702, the at least two target subframe sets obtained by the network-side device include the first subframe set and the second subframe set. The network-side device configures the first power control parameter for the first subframe set, and configures the second power control parameter for the second subframe set. For different target subframe sets, different power control parameters are configured. Further, that the network-side device configures a first power control parameter for the first subframe set, and configures a second power control parameter for the second subframe set in step F1 may include the following step.

F11. When a target subframe set to which a subframe of the UE belongs is the first subframe set, the network-side device configures the first power control parameter for the UE, or when a target subframe set to which a subframe of the UE belongs is the second subframe set, the network-side device configures the second power control parameter for the UE.

In the configuration mode of step F1 above, the network-side device first obtains the target subframe set to which the subframe of the UE belongs, and therefore determines whether the target subframe set is the first subframe set or the second subframe set. The power control parameter that may be used by the UE in the current subframe may be determined according to a correspondence between the subframe set and the power control parameter.

In some embodiments of the present invention, that the network-side device configures power control parameters respectively corresponding to different target subframe sets on the flexible time-frequency resource for UE in step 703 may specifically include the following step.

G1. When the UE uses an accumulated mode in the subframes in the target subframe sets, the network-side device calculates, according to a power control parameter used by the UE in a previous subframe in a corresponding same target subframe set, a power control parameter used by the UE in a current subframe, or the network-side device calculates, according to a power control parameter used by the UE in a previous subframe in a same subframe subset in a corresponding same target subframe set, a power control parameter used by the UE in a current subframe.

In the application scenario of step G1, the network-side device first determines whether the UE uses the accumulated mode in the subframes in the target subframe sets. If the accumulated mode is used in the subframes of the UE, and the current subframe and the previous subframe of the UE belong to the same target subframe set, the network-side device may calculate, according to the power control parameter used by the UE in the previous subframe, the power control parameter used by the UE in the current subframe. In the implementation scenario of step A1, if the first subframe set is divided into a plurality of subframe subsets, it needs to be further determined that the current subframe and the previous subframe of the UE belong to the same subframe subset in the same target subframe set. In this case, the UE may calculate, according to the power control parameter used by the UE in the previous subframe, the power control parameter used by the UE in the current subframe.

704. The network-side device sends the configured power control parameter to the UE.

In this embodiment of the present invention, the network-side device completely configures corresponding power control parameters for different target subframe sets according to the mode in step 703. Then the network-side device may further send the configured power control parameter to the UE.

Optionally, in an embodiment, that the network-side device sends the configured power control parameter to the UE in step 704 may specifically include the following step.

H1. The network-side device sends the configured power control parameter to the UE by using radio resource control (English: Radio Resource Control, RRC for short) signaling, broadcast signaling, or physical layer signaling.

The network-side device may send the power control parameter to the UE in a plurality of manners, for example, by using the RRC signaling, the broadcast signaling, or the physical layer L1 signaling. Specifically, this depends on a preconfigured communication mode between the network-side device and the UE, and is not limited herein.

Optionally, in an embodiment, that the network-side device sends the configured power control parameter to the UE in step 704 may specifically include the following step.

I1. The network-side device sends the configured power control parameter on a specific carrier to the UE.

Specifically, the network-side device may send the power control parameter to the UE by using a preconfigured specific carrier, and the network-side device sends the power control parameter to the UE by using the predetermined specific carrier. Likewise, the UE needs to receive, only on the specific carrier, the power control parameter sent by the network-side device.

Further, that the network-side device sends the configured power control parameter on a specific carrier to the UE in step I1 may include the following step.

I11. When the neighboring cell has a same uplink-downlink configuration of subframes on a plurality of carriers, and correspondingly, the target cell has a same uplink-downlink configuration of subframes on the plurality of carriers, the network-side device determines the specific carrier from the plurality of carriers, and sends, on the specific carrier to the UE, the configured power control parameter, and/or a target subframe set or a subframe subset corresponding to the power control parameter, and/or a carrier set or a carrier subset corresponding to the power control parameter.

Optionally, in an embodiment, when the neighboring cell has the same uplink-downlink configuration of subframes on the plurality of carriers, and correspondingly, the target cell has the same uplink-downlink configuration of subframes on the plurality of carriers, the network-side device determines the specific carrier from the plurality of carriers, and then sends configuration information on the specific carrier to the UE by using RRC signaling, broadcast signaling, or physical layer L1 signaling. For example, the target cell is a cell 1 in FIG. 3, and neighboring cells are a cell 2 and a cell 3 in the figure. The target cell uses three carriers. The target cell uses a configuration 2 as an uplink-downlink configuration of subframes on the three carriers, namely, the carrier 1, the carrier 2, and the carrier 3 uniformly, the cell 2 uses a configuration 1 as an uplink-downlink configuration of subframes on the three carriers uniformly, and the cell 3 uses a configuration 0 as an uplink-downlink configuration of subframes on the three carriers uniformly. In this case, the network-side device may determine one of the three carriers as a specific carrier. The network-side device sends the power control parameter on the specific carrier to the UE by using RRC signaling, broadcast signaling, or physical layer L1 signaling, and does not need to send the power control parameter on every carrier. This may reduce signaling overheads.

As can be learned from the descriptions of the examples of the present invention in the foregoing embodiment, first, the network-side device obtains the at least two target subframe sets; and then the network-side device configures the power control parameters respectively corresponding to different target subframe sets on the flexible time-frequency resource for the UE, so that the UE transmits data in the subframes in the target subframe sets according to the power control parameters configured by the network-side device, where the flexible time-frequency resource includes a time domain resource and/or a frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

In the foregoing embodiment, the power control method provided by this embodiment of the present invention is described from a perspective of the network-side device. The following describes, from a perspective of UE that interacts with a network-side device, a power control method provided by an embodiment of the present invention. Referring to FIG. 8, the power control method provided by this embodiment of the present invention includes the following steps.

801. UE obtains power control parameters configured by a network-side device for the UE and corresponding to different target subframe sets on a flexible time-frequency resource, where the flexible time-frequency resource includes a time domain resource and/or a frequency domain resource whose transmission direction is configurable.

In this embodiment of the present invention, the network-side device configures power control parameters corresponding to different target subframe sets on the flexible time-frequency resource for the UE. In an application scenario of the flexible time-frequency resource, when the UE needs to use a power control parameter in a current subframe, the UE may first obtain the power control parameters configured by the network-side device and corresponding to different target subframe sets. For example, the UE may obtain, in a preconfiguration mode or by interacting with the network-side device, the power control parameters corresponding to different target subframe sets.

In some embodiments of the present invention, the target subframe sets include a first subframe set and a second subframe set, and the first subframe set and the second subframe set are determined by the network-side device according to an uplink-downlink configuration of subframes on the flexible time-frequency resource for a target cell and at least one neighboring cell of the target cell, where the first subframe set includes a subframe whose transmission direction is uplink in the target cell and whose transmission direction is not uniformly uplink in the at least one neighboring cell, and the second subframe set includes a subframe whose transmission direction is uniformly uplink in the target cell and the at least one neighboring cell.

The network-side device may configure the first subframe set and the second subframe set. For details, refer to the specific implementation of the network-side device in the foregoing embodiment. A target subframe set to which a subframe of the UE belongs may be the first subframe set or the second subframe set, and this is specifically determined by a configuration of the current subframe of the UE.

Optionally, in some embodiments of the present invention, that UE obtains power control parameters configured by a network-side device for the UE and corresponding to different target subframe sets on a flexible time-frequency resource in step 801 includes:

when a target subframe set to which a subframe of the UE belongs is the first subframe set, the UE determines, according to a subframe subset to which the subframe of the UE belongs, a power control parameter configured by the network-side device for the UE.

In the foregoing application scenario, when the target subframe set to which the subframe of the UE belongs is the first subframe set, the first subframe set is divided into a plurality of subframe subsets, and the network-side device may configure corresponding power control parameters for the UE according to the subframe subsets. For example, for each subframe subset, the network-side device sets a power control parameter for the subframe subset. When the UE determines the subframe subset to which the subframe of the UE belongs, the power control parameter that may be used by the UE in the current subframe may be determined.

Further, in step 801, that the UE determines, according to a subframe subset to which the subframe of the UE belongs, a power control parameter configured by the network-side device for the UE includes:

the UE determines, according to a subframe subset index or an attribute identifier of the subframe subset to which the subframe of the UE belongs, the power control parameter configured by the network-side device for the UE.

With respect to division of the first subframe set by the network-side device, after the plurality of subframe subsets are obtained, a corresponding index is configured for each subframe subset, or an attribute identifier is set for each subframe subset. The network-side device may configure the power control parameter according to the subframe subset index or the attribute identifier of the subframe subset. When the UE determines the subframe subset to which the subframe of the UE belongs, the power control parameter that may be used by the UE in the current subframe may be determined according to the subframe subset index or the attribute identifier of the subframe subset.

Optionally, in some embodiments of the present invention, that UE obtains power control parameters configured by a network-side device for the UE and corresponding to different target subframe sets on a flexible time-frequency resource in step 801 includes:

the UE determines, according to a subframe index of a subframe of the UE, a power control parameter configured by the network-side device for the UE.

Specifically, in the foregoing application scenario, for the first subframe set, the network-side device configures a corresponding power control parameter for each subframe index. As can be learned from the description about the first subframe set, the first subframe set includes a flexible frequency band/subband/subframe, and therefore, each subframe index needs to correspond to a power control parameter. However, for the second subframe set, as can be learned from the description about the second subframe set, the second subframe set includes a fixed frequency band/subband/subframe, and therefore, a same power control parameter may be configured for a plurality of subframes. The UE may determine, according to the subframe index of the subframe of the UE, a power control parameter corresponding to the subframe index.

Optionally, in some embodiments of the present invention, that UE obtains power control parameters configured by a network-side device for the UE and corresponding to different target subframe sets on a flexible time-frequency resource in step 801 includes:

the UE determines, according to an interference level of a subframe of the UE, a power control parameter configured by the network-side device for the UE.

The interference level of the subframe of the UE may be a U-U-U interference group, a U-U-D interference group, and a U-D-D interference group. This is related to a matched interference type in an ambient environment. Therefore, the interference level of the subframe of the UE may be determined according to an interference type of mutual interference between the target cell and the neighboring cell.

Optionally, in some embodiments of the present invention, that UE obtains power control parameters configured by a network-side device for the UE and corresponding to different target subframe sets on a flexible time-frequency resource in step 801 includes:

the UE determines whether a target subframe set to which a subframe of the UE belongs is the first subframe set or the second subframe set; and when the target subframe set to which the subframe of the UE belongs is the first subframe set, the UE determines that the network-side device configures a first power control parameter for the UE, or when the target subframe set to which the subframe of the UE belongs is the second subframe set, the UE determines that the network-side device configures a second power control parameter for the UE.

In the configuration mode of the step above, the UE obtains the target subframe set to which the subframe of the UE belongs, and therefore determines whether the target subframe set is the first subframe set or the second subframe set. The power control parameter that may be used by the UE in the current subframe may be determined according to a correspondence between the subframe set and the power control parameter.

Optionally, in some embodiments of the present invention, the power control parameter includes an open-loop power control parameter and/or a closed-loop power control parameter.

Further, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

Optionally, in some embodiments of the present invention, the power control parameter includes a configured cell-specific power control parameter and/or a configured UE-specific power control parameter.

Further, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

Optionally, in some embodiments of the present invention, that UE obtains power control parameters configured by a network-side device for the UE and corresponding to different target subframe sets on a flexible time-frequency resource includes:

when the UE determines to use the accumulated mode in the subframes in the target subframe sets, the UE calculates, according to a power control parameter used in a previous subframe in a corresponding same target subframe set, a power control parameter used by the UE in a current subframe, or the UE calculates, according to a power control parameter used in a previous subframe in a same subframe subset in a corresponding same target subframe set, a power control parameter used by the UE in a current subframe.

In the foregoing application scenario, the UE first determines whether the UE uses the accumulated mode in the subframes in the target subframe sets. If the accumulated mode is used in the subframes of the UE, and the current subframe and the previous subframe of the UE belong to the same target subframe set, the UE may calculate, according to the power control parameter used by the UE in the previous subframe, the power control parameter used by the UE in the current subframe. If the first subframe set is divided into a plurality of subframe subsets, it needs to be further determined that the current subframe and the previous subframe of the UE belong to the same subframe subset in the same target subframe set. In this case, the UE may calculate, according to the power control parameter used by the UE in the previous subframe, the power control parameter used by the UE in the current subframe.

Optionally, in some embodiments of the present invention, the flexible time-frequency resource includes at least one of the following resources: a flexible frequency band, a flexible subband, a flexible subframe, a flexible frame, and a flexible superframe. Further, the flexible frequency band is an uplink UL frequency band in a frequency division duplex FDD system; the flexible subband is a UL subband in the FDD system; the flexible subframe is a subframe in a time division duplex TDD system; the flexible frame is a frame in the TDD system; and the flexible superframe is a superframe in the TDD system.

Optionally, in some embodiments of the present invention, that UE obtains power control parameters configured by a network-side device for the UE and corresponding to different target subframe sets on a flexible time-frequency resource in step 801 includes:

the UE receives, by using radio resource control RRC signaling, broadcast signaling, or physical layer signaling, the power control parameter sent by the network-side device.

The network-side device may send the power control parameter to the UE in a plurality of manners, for example, by using the RRC signaling, the broadcast signaling, or the physical layer L1 signaling. Specifically, this depends on a preconfigured communication mode between the network-side device and the UE, and is not limited herein.

Optionally, in some embodiments of the present invention, that UE obtains power control parameters configured by a network-side device for the UE and corresponding to different target subframe sets on a flexible time-frequency resource in step 801 includes:

the UE receives, on a specific carrier, the power control parameter sent by the network-side device.

Specifically, the network-side device may send the power control parameter to the UE by using a preconfigured specific carrier, and the network-side device sends the power control parameter to the UE by using the predetermined specific carrier. Likewise, the UE needs to receive, only on the specific carrier, the power control parameter sent by the network-side device.

Further, that the UE receives, on a specific carrier, the power control parameter sent by the network-side device includes:

when the neighboring cell has a same uplink-downlink configuration of subframes on a plurality of carriers, and correspondingly, the target cell has a same uplink-downlink configuration of subframes on the plurality of carriers, the UE determines the specific carrier from the plurality of carriers, and receives, on the specific carrier, the power control parameter, and/or a target subframe set or a subframe subset corresponding to the power control parameter, and/or a carrier set or a carrier subset corresponding to the power control parameter that are/is sent by the network-side device.

Optionally, in an embodiment, when the neighboring cell has the same uplink-downlink configuration of subframes on the plurality of carriers, and correspondingly, the target cell has the same uplink-downlink configuration of subframes on the plurality of carriers, the network-side device determines the specific carrier from the plurality of carriers, and then sends configuration information on the specific carrier to the UE by using RRC signaling, broadcast signaling, or physical layer L1 signaling. The UE receives, on the specific carrier by using the RRC signaling, the broadcast signaling, or the physical layer L1 signaling, the power control parameter sent by the network-side device, and does not need to receive the power control parameter on every carrier. This may reduce signaling overheads.

802. The UE transmits data in subframes in the target subframe sets according to the power control parameters.

In this embodiment of the present invention, the UE determines, by performing the foregoing step 801, the power control parameters that need to be used by the UE; and then the UE can transmit the data in the subframes in the target subframe sets according to the power control parameters. Because the network-side device configures power control parameters corresponding to different target subframe sets, the UE can transmit the data according to the power control parameters configured by the network-side device. In this way, a manner of using a fixed power control parameter by the UE is avoided. In this embodiment of the present invention, when the UE transmits the data according to the power control parameters configured by the network-side device, cross-timeslot interference can be avoided in the application scenario of the flexible time-frequency resource.

As can be learned from the descriptions of the examples of the present invention in the foregoing embodiment, first, the UE obtains the power control parameters configured by the network-side device for the UE and corresponding to different target subframe sets on the flexible time-frequency resource; and then the UE transmits the data in the subframes in the target subframe sets according to the power control parameters configured by the network-side device, where the flexible time-frequency resource includes the time domain resource and/or the frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

For better understanding and implementing the foregoing solution of this embodiment of the present invention, the following uses a corresponding application scenario as an example for detailed description. In the following description, for example, the flexible time-frequency resource is specifically a flexible frequency band, a flexible subframe, or a flexible subband. In an actual application of the present invention, according to distribution of uplink and downlink services in a network, flexible frequency bands may be allocated for uplink transmission or downlink transmission, so that uplink and downlink spectrum resources match uplink and downlink service requirements, thereby improving spectrum utilization. In this embodiment of the present invention, an enhanced power control mechanism in a flexible full duplex system may be implemented, so that a transmit power can be set for the UE in the flexible full duplex system more flexibly and efficiently.

In some embodiments of the present invention, the power control parameters configured by the network-side device may be configured based on the frequency band/subband/subframe index. For example, there are unified configurations and indications on a specific primary carrier. More specifically, for example, $P_{O\_UE\_PUSCH}$ in PUSCH power control, $P_{O\_UE\_PUCCH}$ in PUCCH power control, $P_{SRS\_OFFSET}$ in SRS power control, and whether to use the accumulated mode may be configured based on the frequency band/subband/subframe index. For example, RRC parameters may be introduced to configure the power control parameters. For example, the network-side device configures a power control parameter for a fixed frequency band/subband/subframe, but configures a corresponding power control parameter for each flexible frequency band/subband/subframe.

In some embodiments of the present invention, the power control parameters configured by the network-side device may be configured based on a group. More specifically, for example, $P_{O\_UE\_PUSCH}$ in PUSCH power control, $P_{O\_UE\_PUCCH}$ in PUCCH power control, $P_{SRS\_OFFSET}$ in SRS power control, and whether to use the accumulated mode may be grouped and configured by RRC. Grouping may be performed according to a predefined rule. For example, the following two manners may be used:

1. interference level: for example, a U-U-U interference group, a U-U-D interference group, and a U-D-D interference group, related to matched interference types in an ambient environment; and 2. a plurality of frequency bands/subbands/subframes: for example, a plurality of flexible subbands or subframe groups and fixed subbands or subframe groups.

For example, there is only one power control parameter in a current process in the prior art, but a plurality of power control parameter sets are used in this embodiment of the present invention and correspond to different target subframe sets. In the prior art, a same power control parameter is used for all carriers and frequency bands, and cannot correspond to different interference. However, in this embodiment of the present invention, different power settings need to be introduced, and a plurality of power control parameters are configured through grouping and classification. More specifically, the power control parameters may be further configured based on the frequency band/subband/subframe index/group. To be specific, each frequency band/subband/subframe/group has a set of power control parameter settings, and the settings of the frequency band/subband/subframe/group are defined by using RRC signaling. For example, $P_{O\_UE\_PUSCH}$, $P_{O\_UE\_PUCCH}$, and $P_{SRS\_OFFSET}$ may be configured based on the frequency band/subband/subframe index/group. Because interference levels between flexible subframes and fixed subframes are different, and interference levels between flexible subframes are different, a set of power control parameters may be configured for fixed subframes, and different power control parameters may be configured for each flexible subband/subframe. For example, by setting RRC signaling, $P_{O\_UE\_PUSCH}$, $P_{O\_UE\_PUCCH}$, and $P_{SRS\_OFFSET}$ parameters may be configured for different frequency bands/subbands/subframes/groups.

In some embodiments of the present invention, the power control parameters configured by the network-side device may limit behavior of the UE, for example, UL transmission in the frequency band/subband/subframe (i, j, k). The UE applies the power control parameters to the frequency band/subband/subframe (i, j, k) according to the configuration of the frequency band/subband/subframe index/group of RRC. The power control parameters matching the frequency band/subband/subframe to be further divided are expressed as S, and grouping of S may be implicitly performed in a predefined manner, for example:

Manner #1: For a specific frequency band/subband, grouping is based on a TDD configuration, for example, TDD configuration 2: as shown in Table 1, according to configurations of neighboring cells and corresponding flexible modes, S={3, 8, 4, 9} is grouped into S0={3, 8} and S1={4, 9}; for S=all DL subframes, S is grouped into S0={0, 1, 5, 6} and S1={3, 4, 8, 9};

TDD configuration 5: according to configurations of neighboring cells and corresponding flexible modes, S={3, 4} is grouped into S0=131 and S1={4}; for S=all DL subframes, S is grouped into S0={0, 1, 5, 6} and S1={3, 4}.

Manner #2: For a specific frequency band/subband, grouping is based on a subframe index, that is, S0={S(2i)}, where i=0, 1, . . . , ceil(N/2)−1, and S1={S(2i+1)}, where i=0, 1, . . . , floor(N/2)−1. N is a quantity of subframes, and i is a sequence number of a subframe. This means that a subframe satisfying the rule other than a restricted subframe is allowed to be in a flexible mode. Some special information is broadcast in the restricted subframe. Therefore, the restricted subframe must be protected and cannot be configured randomly as a flexible subframe.

Manner #3: Grouping is based on a predefined set A, for example, S0=S∩A, and S1=S−(S∩A). Using subframes in a specific frequency band/subband as an example, a same grouping rule may be extended to the frequency band/subband. For UL transmission in the frequency band/subband/subframe (i, j, k), the UE applies the power control parameters to the frequency band/subband/subframe (i, j, k) according to the configuration of the frequency band/subband/subframe index/group of RRC.

The UE capable of flexible full duplex applies the power control parameters to each frequency band/subband/subframe. For example, if $P_{O\_UE\_PUSCH}$ is indicated by (−8, −4, −2, 3, 5, 6, 7) in RRC signaling, and there is PUSCH transmission in the subframe 3, the UE applies 2 to $P_{O\_UE\_PUSCH}$ when calculating a PUSCH transmit power in the subframe 3.

For another example, it is assumed that groups are configured according to different types of frequency bands/subbands/subframes. For example, a frequency band i, a subband j, and subframes 0, 1, 5, and 6 are fixed subframes and are allocated to a group 1; and the frequency band i, the subband j, and subframes 2, 3, 4, 7, 8, and 9 are flexible subframes and are allocated to a group 2. In addition, it is assumed that $P_{O\_UE\_PUSCH}$ is indicated by (−8, 6) in RRC signaling, and that there is PUSCH transmission in the frequency band i, the subband j, and the subframe 3. In this case, the UE applies 6 to $P_{O\_UE\_PUSCH}$ when calculating a PUSCH transmit power in the frequency band i, the subband j, and the subframe 3.

In some embodiments of the present invention, in the power control parameters configured by the network-side device, when the accumulated mode is used in a specific frequency band/subband/subframe, TPC-related parameters in a power control equation are updated separately. For different frequency bands/subbands/subframes/groups configured based on RRC, for example, for a fixed frequency band/subband/subframe, TPC-related parameters may be updated separately; and for each flexible frequency band/subband/subframe having different PO configuration values, TPC-related parameters may be updated separately.

Herein PUSCH power control in the accumulated mode is used as an example: $f_c(i)=f_c(i-1)+\delta_{PUSCH,c}(i-K_{PUSCH})$.

In a PUSCH equation, a TPC command related parameter is $f_c$, and this parameter is updated when an uplink grant includes a TPC command: $f_c(i)=f_c(i-1)$, where $f_c(i-1)$ is a value in a previous subframe. Otherwise, in the equation, $\delta_{PUSCH,c}(i-K_{PUSCH})$ is a TPC command in a related UL grant, and does not need to be modified.

$f_c(m-1)$ needs to be modified to $f_c(m-n)$, where m−n is a previous frequency band/subband/subframe of a specific type and having a same $P_O$ value in RRC configurations, or is a subframe previous to a subframe of a frequency band/subband (i, j) in a same group. For example, if fixed subframes are 0, 1, 5, and 6, if m=5, m−n=1. For another example, if a flexible subframe having a same $P_O$ value is a subframe 4, if m=4, m−n=4 in a previous radio frame. If flexible subframes 2, 3, 4, 7, 8, and 9 are allocated to a same group, if m=7, m−n=4.

According to the descriptions of the examples in this embodiment of the present invention, for an interference state in a more complex flexible full duplex enhanced network, the power control method provided by this embodiment of the present invention can properly process different interference levels between a fixed frequency band/subband/subframe and a flexible frequency band/subband/subframe, and between flexible frequency bands/subbands/subframes. The power control method provided by this embodiment of the present invention has low complexity and has limited impact on the specification.

It should be noted that, for ease of description in the foregoing method embodiments, the method is described as a series of actions. Persons skilled in the art should understand that the actions in the present invention are not limited by the sequence described herein because some steps may occur in another sequence or occur simultaneously according to the present invention. In addition, persons skilled in the art should also appreciate that all the embodiments described in the specification are preferred embodiments, and the related actions and modules are not necessarily mandatory to the present invention.

For better implementing the foregoing solutions of the embodiments of the present invention, the following further provides related apparatuses for implementing the foregoing solutions.

Referring to FIG. 9-a, a network-side device 900 provided by an embodiment of the present invention may include an obtaining module 901 and a power configuration module 902.

The obtaining module 901 is configured to obtain at least two target subframe sets.

The power configuration module 902 is configured to configure power control parameters respectively corresponding to different target subframe sets on a flexible time-frequency resource for user equipment UE, so that the UE transmits data in subframes in the target subframe sets according to the power control parameters, where the flexible time-frequency resource includes a time domain resource and/or a frequency domain resource whose transmission direction is configurable.

In some embodiments of the present invention, referring to FIG. 9-b, the network-side device 900 further includes a subframe configuration module 903.

Before the obtaining module 901 obtains the at least two target subframe sets, the subframe configuration module 903 is configured to allocate, according to an uplink-downlink configuration of subframes on the flexible time-frequency resource for a target cell and at least one neighboring cell of the target cell, a subframe whose transmission direction is uplink in the target cell and whose transmission direction is not uniformly uplink in the at least one neighboring cell to a first subframe set, and a subframe whose transmission direction is uniformly uplink in the target cell and the at least one neighboring cell to a second subframe set, where the target subframe sets include the first subframe set and the second subframe set.

In some embodiments of the present invention, the subframe configuration module 903 is specifically configured to divide the first subframe set into a plurality of subframe subsets, where each subframe subset in the plurality of subframe subsets includes a subframe or subframes with an equal quantity of downlink or uplink transmission directions in the at least one neighboring cell.

In some embodiments of the present invention, the power configuration module 902 is specifically configured to configure a corresponding power control parameter for the UE according to each subframe subset when a target subframe set to which a subframe of the UE belongs is the first subframe set.

In some embodiments of the present invention, the power configuration module 902 is specifically configured to configure the corresponding power control parameter for the UE according to each subframe subset index or an attribute identifier of each subframe subset.

In some embodiments of the present invention, the power configuration module 902 is specifically configured to: when a target subframe set to which a subframe of the UE belongs is the first subframe set, configure a corresponding power control parameter for the UE according to each subframe index; or when a target subframe set to which a subframe of the UE belongs is the second subframe set, configure a same power control parameter for a plurality of subframes of the UE.

In some embodiments of the present invention, in contrast to FIG. 9-b, referring to FIG. 9-c, the network-side device 900 further includes an interference determining module 904, configured to determine an interference level of a subframe of the UE according to an interference type of mutual interference between the target cell and the at least one neighboring cell before the subframe configuration module 903 allocates, according to the uplink-downlink configuration of the subframes on the flexible time-frequency resource for the target cell in which the user equipment UE is located and the at least one neighboring cell of the target cell, the subframe whose transmission direction is uplink in the target cell and whose transmission direction is not uniformly uplink in the at least one neighboring cell to the first subframe set; and the power configuration module 902 is specifically configured to determine, according to the interference level of the subframe of the UE on the flexible time-frequency resource, power control parameters corresponding to different interference levels.

In some embodiments of the present invention, the power configuration module 902 is specifically configured to configure a first power control parameter for the first subframe set, and configure a second power control parameter for the second subframe set, where the first power control parameter and the second power control parameter are different power control parameters.

In some embodiments of the present invention, the power control parameter includes an open-loop power control parameter and/or a closed-loop power control parameter.

In some embodiments of the present invention, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

In some embodiments of the present invention, the power control parameter includes a configured cell-specific power control parameter and/or a configured UE-specific power control parameter.

In some embodiments of the present invention, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

In some embodiments of the present invention, the power configuration module 902 is specifically configured to: when the UE uses the accumulated mode in the subframes in the target subframe sets, calculate, according to a power control parameter used by the UE in a previous subframe in a corresponding same target subframe set, a power control parameter used by the UE in a current subframe, or calculate, according to a power control parameter used by the UE in a previous subframe in a same subframe subset in a corresponding same target subframe set, a power control parameter used by the UE in a current subframe.

In some embodiments of the present invention, the flexible time-frequency resource includes at least one of the following resources: a flexible frequency band, a flexible subband, a flexible subframe, a flexible frame, and a flexible superframe.

In some embodiments of the present invention, in contrast to FIG. 9-*a*, referring to FIG. 9-*d*, the network-side device 900 further includes a sending module 905, configured to send the configured power control parameter to the UE after the power configuration module 902 configures the power control parameters respectively corresponding to different target subframe sets on the flexible time-frequency resource for the user equipment UE.

In some embodiments of the present invention, the sending module 905 is specifically configured to send the configured power control parameter on a specific carrier to the UE.

In some embodiments of the present invention, the sending module 905 is specifically configured to: when the neighboring cell has a same uplink-downlink configuration of subframes on a plurality of carriers, and correspondingly, the target cell has a same uplink-downlink configuration of subframes on the plurality of carriers, determine the specific carrier from the plurality of carriers, and send, on the specific carrier to the UE, the configured power control parameter, and/or a target subframe set or a subframe subset corresponding to the power control parameter, and/or a carrier set or a carrier subset corresponding to the power control parameter.

As can be learned from the descriptions of the examples of the present invention in the foregoing embodiment, first, the network-side device obtains the at least two target subframe sets; and then the network-side device configures the power control parameters respectively corresponding to different target subframe sets on the flexible time-frequency resource for the UE, so that the UE transmits the data in the subframes in the target subframe sets according to the power control parameters configured by the network-side device, where the flexible time-frequency resource includes the time domain resource and/or the frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

Referring to FIG. 10, UE 1000 provided by an embodiment of the present invention may include an obtaining module 1001 and a transmission module 1002.

The obtaining module 1001 is configured to obtain power control parameters configured by a network-side device for the UE and corresponding to different target subframe sets on a flexible time-frequency resource, where the flexible time-frequency resource includes a time domain resource and/or a frequency domain resource whose transmission direction is configurable.

The transmission module 1002 is configured to transmit data in subframes in the target subframe sets according to the power control parameters.

In some embodiments of the present invention, the target subframe sets include a first subframe set and a second subframe set, and the first subframe set and the second subframe set are determined by the network-side device according to an uplink-downlink configuration of subframes on the flexible time-frequency resource for a target cell and at least one neighboring cell of the target cell, where the first subframe set includes a subframe whose transmission direction is uplink in the target cell and whose transmission direction is not uniformly uplink in the at least one neighboring cell, and the second subframe set includes a subframe whose transmission direction is uniformly uplink in the target cell and the at least one neighboring cell.

In some embodiments of the present invention, when a target subframe set to which a subframe of the UE belongs is the first subframe set, the obtaining module 1001 is specifically configured to determine, according to a subframe subset to which the subframe of the UE belongs, a power control parameter configured by the network-side device for the UE.

In some embodiments of the present invention, the obtaining module 1001 is specifically configured to determine, according to a subframe subset index or an attribute identifier of the subframe subset to which the subframe of the UE belongs, the power control parameter configured by the network-side device for the UE.

In some embodiments of the present invention, the obtaining module 1001 is specifically configured to determine, according to a subframe index of a subframe of the UE, a power control parameter configured by the network-side device for the UE.

In some embodiments of the present invention, the obtaining module 1001 is specifically configured to determine, according to an interference level of a subframe of the UE, a power control parameter configured by the network-side device for the UE.

In some embodiments of the present invention, the obtaining module 1001 is specifically configured to: determine whether a target subframe set to which a subframe of the UE belongs is the first subframe set or the second subframe set; and when the target subframe set is the first subframe set, determine that the network-side device configures a first power control parameter for the UE, or when the target subframe set to which the subframe of the UE belongs is the second subframe set, determine that the network-side device configures a second power control parameter for the UE.

In some embodiments of the present invention, the power control parameter includes an open-loop power control parameter and/or a closed-loop power control parameter.

In some embodiments of the present invention, the open-loop power control parameter includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

In some embodiments of the present invention, the power control parameter includes a configured cell-specific power control parameter and/or a configured UE-specific power control parameter.

In some embodiments of the present invention, the configured cell-specific power control parameter includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

In some embodiments of the present invention, when the UE determines to use the accumulated mode in the subframes in the target subframe sets, the obtaining module 1001 is specifically configured to calculate, according to a power control parameter used in a previous subframe in a corresponding same target subframe set, a power control parameter used by the UE in a current subframe, or calculate, according to a power control parameter used in a previous subframe in a same subframe subset in a corresponding same target subframe set, a power control parameter used by the UE in a current subframe.

In some embodiments of the present invention, the flexible time-frequency resource includes at least one of the following resources: a flexible frequency band, a flexible subband, a flexible subframe, a flexible frame, and a flexible superframe.

In some embodiments of the present invention, the obtaining module 1001 is specifically configured to receive, on a specific carrier, the power control parameter sent by the network-side device.

In some embodiments of the present invention, the obtaining module 1001 is specifically configured to: when the neighboring cell has a same uplink-downlink configuration of subframes on a plurality of carriers, and correspondingly, the target cell has a same uplink-downlink configuration of subframes on the plurality of carriers, determine the specific carrier from the plurality of carriers, and receive, on the specific carrier, the power control parameter, and/or a target subframe set or a subframe subset corresponding to the power control parameter, and/or a carrier set or a carrier subset corresponding to the power control parameter that are/is sent by the network-side device.

As can be learned from the descriptions of the examples of the present invention in the foregoing embodiment, first, the network-side device obtains the at least two target subframe sets; and then the network-side device configures the power control parameters respectively corresponding to different target subframe sets on the flexible time-frequency resource for the UE, so that the UE transmits the data in the subframes in the target subframe sets according to the power control parameters configured by the network-side device, where the flexible time-frequency resource includes the time domain resource and/or the frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

An embodiment of the present invention further provides a computer storage medium. The computer storage medium stores a program. When the program is executed, some or all steps described in the foregoing method embodiment are performed.

Figure 11:
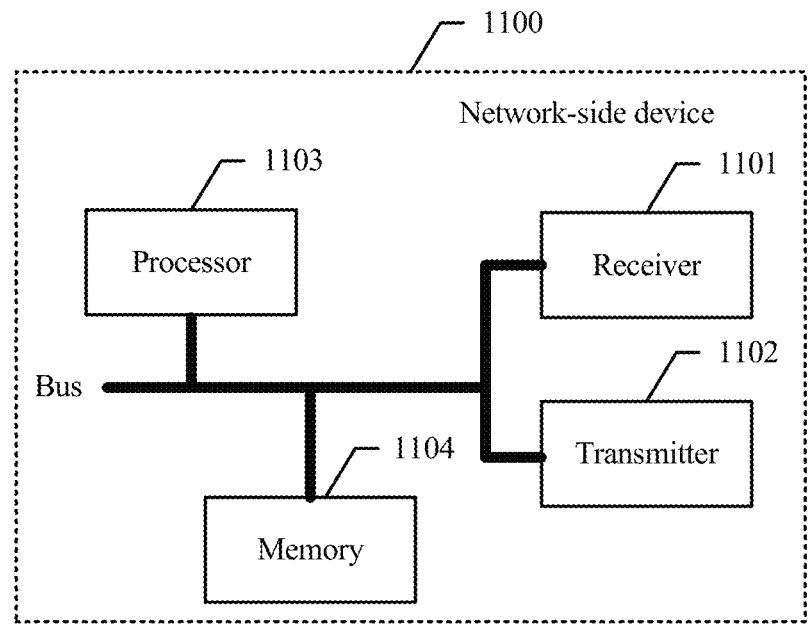
FIG. 11 is a schematic structural diagram of another network-side device according to an embodiment of the present invention.

The following describes another network-side device provided by an embodiment of the present invention. Referring to FIG. 11, a network-side device 1100 includes:

a receiver 1101, a transmitter 1102, a processor 1103, and a memory 1104 (a quantity of processors 1103 in the network-side device 1100 may be one or more, and one processor is used as an example in FIG. 11). In some embodiments of the present invention, the receiver 1101, the transmitter 1102, the processor 1103, and the memory 1104 may be connected by a bus or in another manner, and the connection by a bus is used as an example in FIG. 11.

The memory 1104 may include a read-only memory and a random access memory, and provide an instruction and data to the processor 1103. A part of the memory 1104 may further include a non-volatile random access memory (English: Non-Volatile Random Access Memory, NVRAM for short). The memory 1104 stores an operating system and an operation instruction, an executable module or a data structure, or a subset thereof, or an extended set thereof, where the operation instruction may include various operation instructions, used to implement various operations. The operating system may include various system programs, used to implement various basic services and process hardware-based tasks.

The processor 1103 controls operations of the network-side device. The processor 1103 may also be referred to as a central processing unit (English: Central Processing Unit, CPU for short). In a specific application, components of the network-side device are coupled together by using a bus system. The bus system may further include a power bus, a control bus, a status signal bus, and the like, in addition to a data bus. However, for clear description, various buses in the figure are referred to as the bus system.

The method disclosed by the foregoing embodiment of the present invention may be applied in the processor 1103 or implemented by the processor 1103. The processor 1103 may be an integrated circuit chip and have a signal processing capability. In an implementation process, each step of the foregoing method may be completed by using an integrated logic circuit of hardware in the processor 1103 or an instruction in a form of software. The processor 1103 may be a general purpose processor, a digital signal processor (English: Digital Signal Processor, DSP for short), an application-specific integrated circuit (English: Application-Specific Integrated Circuit, ASIC for short), a field-programmable gate array (English: Field-Programmable Gate Array, FPGA for short) or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor, or the like. Steps of the methods disclosed with reference to the embodiments of the present invention may be directly executed and completed by a hardware decoding processor, or may be executed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1104. The processor 1103 reads information in the memory 1104 and completes the steps in the foregoing methods in combination with hardware of the processor.

In this embodiment of the present invention, the processor 1103 is configured to obtain at least two target subframe sets, and configure power control parameters respectively corresponding to different target subframe sets on a flexible time-frequency resource for user equipment UE, so that the UE transmits data in subframes in the target subframe sets according to the power control parameters, where the flexible time-frequency resource includes a time domain resource and/or a frequency domain resource whose transmission direction is configurable.

In some embodiments of the present invention, before obtaining the at least two target subframe sets, the processor 1103 is further configured to allocate, according to an uplink-downlink configuration of subframes on the flexible time-frequency resource for a target cell and at least one neighboring cell of the target cell, a subframe whose transmission direction is uplink in the target cell and whose transmission direction is not uniformly uplink in the at least one neighboring cell to a first subframe set, and a subframe whose transmission direction is uniformly uplink in the target cell and the at least one neighboring cell to a second subframe set, where the target subframe sets include the first subframe set and the second subframe set.

In some embodiments of the present invention, the processor 1103 is further configured to divide the first subframe set into a plurality of subframe subsets, where each subframe subset in the plurality of subframe subsets includes a subframe or subframes with an equal quantity of downlink or uplink transmission directions in the at least one neighboring cell.

In some embodiments of the present invention, the processor 1103 is specifically configured to configure a corresponding power control parameter for the UE according to each subframe subset when a target subframe set to which a subframe of the UE belongs is the first subframe set.

In some embodiments of the present invention, the processor 1103 is specifically configured to configure the corresponding power control parameter for the UE according to each subframe subset index or an attribute identifier of each subframe subset.

In some embodiments of the present invention, the processor 1103 is specifically configured to: when a target subframe set to which a subframe of the UE belongs is the first subframe set, configure a corresponding power control parameter for the UE according to each subframe index; or when a target subframe set to which a subframe of the UE belongs is the second subframe set, configure a same power control parameter for a plurality of subframes of the UE.

In some embodiments of the present invention, the processor 1103 is specifically configured to: before allocating, according to the uplink-downlink configuration of the subframes on the flexible time-frequency resource for the target cell and the at least one neighboring cell of the target cell, the subframe whose transmission direction is uplink in the target cell and whose transmission direction is not uniformly uplink in the at least one neighboring cell to the first subframe set, determine an interference level of a subframe of the UE according to an interference type of mutual interference between the target cell and the at least one neighboring cell; and determine, according to the interference level of the subframe of the UE on the flexible time-frequency resource, power control parameters corresponding to different interference levels.

In some embodiments of the present invention, the processor 1103 is specifically configured to configure a first power control parameter for the first subframe set, and configure a second power control parameter for the second subframe set, where the first power control parameter and the second power control parameter are different power control parameters.

In some embodiments of the present invention, the processor 1103 is specifically configured to: when a target subframe set to which a subframe of the UE belongs is the first subframe set, configure the first power control parameter for the UE, or when a target subframe set to which a subframe of the UE belongs is the second subframe set, configure the second power control parameter for the UE.

In some embodiments of the present invention, the power control parameter stored in the memory 1104 includes an open-loop power control parameter and/or a closed-loop power control parameter.

In some embodiments of the present invention, the open-loop power control parameter stored in the memory 1104 includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

In some embodiments of the present invention, the power control parameter stored in the memory 1104 includes a configured cell-specific power control parameter and/or a configured UE-specific power control parameter.

In some embodiments of the present invention, the configured cell-specific power control parameter stored in the memory 1104 includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

In some embodiments of the present invention, the processor 1103 is specifically configured to: when the UE uses the accumulated mode in the subframes in the target subframe sets, calculate, according to a power control parameter used by the UE in a previous subframe in a corresponding same target subframe set, a power control parameter used by the UE in a current subframe, or calculate, according to a power control parameter used by the UE in a previous subframe in a same subframe subset in a corresponding same target subframe set, a power control parameter used by the UE in a current subframe.

In some embodiments of the present invention, the flexible time-frequency resource stored in the memory 1104 includes at least one of the following resources: a flexible frequency band, a flexible subband, a flexible subframe, a flexible frame, and a flexible superframe.

In some embodiments of the present invention, the flexible frequency band stored in the memory 1104 is an uplink UL frequency band in a frequency division duplex FDD system; the flexible subband is a UL subband in the FDD system; the flexible subframe is a subframe in a time division duplex TDD system; the flexible frame is a frame in the TDD system; and the flexible superframe is a superframe in the TDD system.

In some embodiments of the present invention, after configuring the power control parameters respectively corresponding to different target subframe sets on the flexible time-frequency resource for the user equipment UE, the processor 1103 is further configured to send the configured power control parameter to the UE.

In some embodiments of the present invention, the processor 1103 is specifically configured to send the configured power control parameter to the UE by using radio resource control RRC signaling, broadcast signaling, or physical layer signaling.

In some embodiments of the present invention, the processor 1103 is specifically configured to send the configured power control parameter on a specific carrier to the UE.

In some embodiments of the present invention, the processor 1103 is specifically configured to: when the neighboring cell has a same uplink-downlink configuration of subframes on a plurality of carriers, and correspondingly, the target cell has a same uplink-downlink configuration of subframes on the plurality of carriers, determine, by the network-side device, the specific carrier from the plurality of carriers, and send, on the specific carrier to the UE, the configured power control parameter, and/or a target subframe set or a subframe subset corresponding to the power control parameter, and/or a carrier set or a carrier subset corresponding to the power control parameter.

As can be learned from the descriptions of the examples of the present invention in the foregoing embodiment, first, the network-side device obtains the at least two target subframe sets; and then the network-side device configures the power control parameters respectively corresponding to different target subframe sets on the flexible time-frequency resource for the UE, so that the UE transmits the data in the subframes in the target subframe sets according to the power control parameters configured by the network-side device, where the flexible time-frequency resource includes the time domain resource and/or the frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

Figure 12:
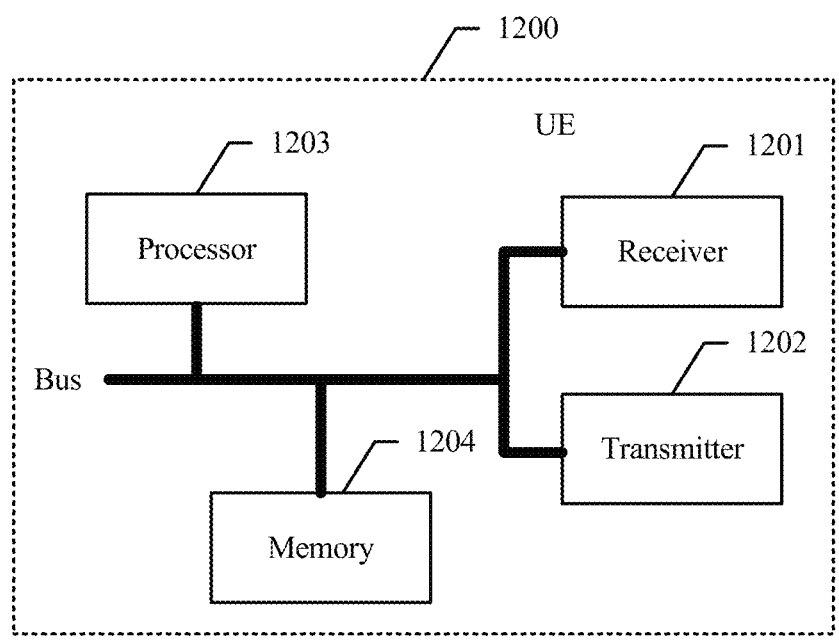
FIG. 12 is a schematic structural diagram of another UE according to an embodiment of the present invention.

The following describes another UE provided by an embodiment of the present invention. Referring to FIG. 12, UE 1200 includes:

a receiver 1201, a transmitter 1202, a processor 1203, and a memory 1204 (a quantity of processors 1203 in the UE 1200 may be one or more, and one processor is used as an example in FIG. 12). In some embodiments of the present invention, the receiver 1201, the transmitter 1202, the processor 1203, and the memory 1204 may be connected by a bus or in another manner, and the connection by a bus is used as an example in FIG. 12.

The memory 1204 may include a read-only memory and a random access memory, and provide an instruction and data to the processor 1203. A part of the memory 1204 may further include an NVRAM. The memory 1204 stores an operating system and an operation instruction, an executable module or a data structure, or a subset thereof, or an extended set thereof, where the operation instruction may include various operation instructions, used to implement various operations. The operating system may include various system programs, used to implement various basic services and process hardware-based tasks.

The processor 1203 controls operations of the UE. The processor 1203 may also be referred to as a CPU. In a specific application, components of the UE are coupled together by using a bus system. The bus system may further include a power bus, a control bus, a status signal bus, and the like, in addition to a data bus. However, for clear description, various buses in the figure are referred to as the bus system.

The method disclosed by the foregoing embodiment of the present invention may be applied in the processor 1203 or implemented by the processor 1203. The processor 1203 may be an integrated circuit chip and have a signal processing capability. In an implementation process, each step of the foregoing method may be completed by using an integrated logic circuit of hardware in the processor 1203 or an instruction in a form of software. The processor 1203 may be a general purpose processor, a DSP, an ASIC, an FPGA or another programmable logic device, a discrete gate or transistor logic device, or a discrete hardware component. The processor may implement or execute the methods, steps, and logic block diagrams disclosed in the embodiments of the present invention. The general purpose processor may be a microprocessor, or the processor may be any conventional processor, or the like. Steps of the methods disclosed with reference to the embodiments of the present invention may be directly executed and completed by a hardware decoding processor, or may be executed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 1204. The processor 1203 reads information in the memory 1204 and completes the steps in the foregoing methods in combination with hardware of the processor.

In this embodiment of the present invention, the processor 1203 is configured to: obtain power control parameters configured by a network-side device for the UE and corresponding to different target subframe sets on a flexible time-frequency resource, where the flexible time-frequency resource includes a time domain resource and/or a frequency domain resource whose transmission direction is configurable; and transmit data in subframes in the target subframe sets according to the power control parameters.

In some embodiments of the present invention, the target subframe sets stored in the memory 1204 include a first subframe set and a second subframe set, and the first subframe set and the second subframe set are determined by the network-side device according to an uplink-downlink configuration of subframes on the flexible time-frequency resource for a target cell and at least one neighboring cell of the target cell, where the first subframe set includes a subframe whose transmission direction is uplink in the target cell and whose transmission direction is not uniformly uplink in the at least one neighboring cell, and the second subframe set includes a subframe whose transmission direction is uniformly uplink in the target cell and the at least one neighboring cell.

In some embodiments of the present invention, when a target subframe set to which a subframe of the UE belongs is the first subframe set, the processor 1203 is specifically configured to determine, according to a subframe subset to which the subframe of the UE belongs, a power control parameter configured by the network-side device for the UE.

In some embodiments of the present invention, the processor 1203 is specifically configured to determine, according to a subframe subset index or an attribute identifier of the subframe subset to which the subframe of the UE belongs, the power control parameter configured by the network-side device for the UE.

In some embodiments of the present invention, the processor 1203 is specifically configured to determine, according to a subframe index of a subframe of the UE, a power control parameter configured by the network-side device for the UE.

In some embodiments of the present invention, the processor 1203 is specifically configured to determine, according to an interference level of a subframe of the UE, a power control parameter configured by the network-side device for the UE.

In some embodiments of the present invention, the processor 1203 is specifically configured to: determine whether a target subframe set to which a subframe of the UE belongs is the first subframe set or the second subframe set; and when the target subframe set to which the subframe of the UE belongs is the first subframe set, determine that the network-side device configures a first power control parameter for the UE, or when the target subframe set to which the subframe of the UE belongs is the second subframe set, determine that the network-side device configures a second power control parameter for the UE.

In some embodiments of the present invention, the power control parameter stored in the memory 1204 includes an open-loop power control parameter and/or a closed-loop power control parameter.

In some embodiments of the present invention, the open-loop power control parameter stored in the memory 1204 includes at least one of the following parameters: a target power value $P_{O\_PUSCH}$ for a physical uplink shared channel, a target power value $P_{O\_PUCCH}$ for a physical uplink control channel, and a target power value $P_{O\_SRS}$ for a sounding reference signal; and the closed-loop power control parameter includes at least one of the following parameters: a modulation and coding scheme MCS incremental parameter $\Delta_{TF}$, a terminal closed-loop power control adjustment parameter $f_c$, and a parameter indicating whether to use an accumulated mode.

In some embodiments of the present invention, the power control parameter stored in the memory 1204 includes a configured cell-specific power control parameter and/or a configured UE-specific power control parameter.

In some embodiments of the present invention, the configured cell-specific power control parameter stored in the memory 1204 includes at least one of the following parameters: a corresponding cell-specific target power value $P_{O\_cell\_PUSCH}$ for a physical uplink shared channel, a corresponding cell-specific target power value $P_{O\_cell\_PUCCH}$ for a physical uplink control channel, and a corresponding cell-specific target power value $P_{O\_cell\_SRS}$ for a sounding reference signal; and the configured UE-specific power control parameter includes at least one of the following parameters: a corresponding UE-specific target power value $P_{O\_UE\_PUSCH}$ for a physical uplink shared channel, a corresponding UE-specific target power value $P_{O\_UE\_PUCCH}$ for a physical uplink control channel, and a corresponding UE-specific target power value $P_{O\_UE\_SRS}$ for a sounding reference signal.

In some embodiments of the present invention, when the UE determines to use the accumulated mode in the subframes in the target subframe sets, the processor 1203 is specifically configured to calculate, according to a power control parameter used in a previous subframe in a corresponding same target subframe set, a power control parameter used by the UE in a current subframe, or calculate, according to a power control parameter used in a previous subframe in a same subframe subset in a corresponding same target subframe set, a power control parameter used by the UE in a current subframe.

In some embodiments of the present invention, the flexible time-frequency resource stored in the memory 1204 includes at least one of the following resources: a flexible frequency band, a flexible subband, a flexible subframe, a flexible frame, and a flexible superframe.

In some embodiments of the present invention, the flexible frequency band stored in the memory 1204 is an uplink UL frequency band in a frequency division duplex FDD system; the flexible subband is a UL subband in the FDD system; the flexible subframe is a subframe in a time division duplex TDD system; the flexible frame is a frame in the TDD system; and the flexible superframe is a superframe in the TDD system.

In some embodiments of the present invention, the processor 1203 is specifically configured to receive, by using radio resource control RRC signaling, broadcast signaling, or physical layer signaling, the power control parameter sent by the network-side device.

In some embodiments of the present invention, the processor 1203 is specifically configured to receive, on a specific carrier, the power control parameter sent by the network-side device.

In some embodiments of the present invention, the processor 1203 is specifically configured to: when the neighboring cell has a same uplink-downlink configuration of subframes on a plurality of carriers, and correspondingly, the target cell has a same uplink-downlink configuration of subframes on the plurality of carriers, determine the specific carrier from the plurality of carriers, and receive, on the specific carrier, the power control parameter, and/or a target subframe set or a subframe subset corresponding to the power control parameter, and/or a carrier set or a carrier subset corresponding to the power control parameter that are/is sent by the network-side device.

As can be learned from the descriptions of the examples of the present invention in the foregoing embodiment, first, the network-side device obtains the at least two target subframe sets; and then the network-side device configures the power control parameters respectively corresponding to different target subframe sets on the flexible time-frequency resource for the UE, so that the UE transmits the data in the subframes in the target subframe sets according to the power control parameters configured by the network-side device, where the flexible time-frequency resource includes the time domain resource and/or the frequency domain resource whose transmission direction is configurable. Because the network-side device in this embodiment of the present invention configures the power control parameters respectively corresponding to different target subframe sets, when the subframes of the UE belong to different target subframe sets, the power control parameter currently used by the UE can be determined according to the configuration of the network-side device. Therefore, the power control method provided by this embodiment of the present invention is applicable to a flexible full duplex network, to avoid uplink-downlink cross-timeslot interference caused by power control parameters that are configured in a semi-static mode.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. Persons of ordinary skill in the art may understand and implement the embodiments of the present invention without creative efforts.

Based on the description of the foregoing implementations, persons skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation in most cases. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A power control method, comprising:
obtaining, by a network-side device, at least two target subframe sets on a flexible time-frequency resource of a target cell and at least one neighboring cell, wherein the flexible time-frequency resource comprises a time domain resource having a configurable transmission direction or a frequency domain resource having a configurable transmission direction and wherein the target subframe sets comprise a first subframe set; and
configuring, by the network-side device, power control parameters respectively corresponding to different target subframe sets to enable a user equipment (UE) to transmit data in subframes of the target subframe sets according to the power control parameters, wherein the first subframe set comprises one or more subframes having an uplink transmission direction in the target cell and a not uniformly uplink transmission direction in the neighboring cell, and wherein a power control parameter of the first subframe set is configured according to each subframe index.

2. The power control method of claim 1, wherein before obtaining the target subframe sets, the power control method further comprises allocating, by the network-side device, a subframe having an uplink transmission direction in the target cell and a not uniformly uplink transmission direction in the neighboring cell to the first subframe set and a subframe having a uniformly uplink transmission direction in the target cell and the neighboring cell to a second subframe set of the target subframe sets.

3. The power control method of claim 2, wherein configuring the power control parameters comprises configuring, by the network-side device, a corresponding power control parameter for the UE according to each subframe subset when the target subframe set to which a subframe of the UE belongs is the first subframe set, wherein a power control parameter comprises an open-loop power control parameter or a closed-loop power control parameter, wherein the open-loop power control parameter comprises at least one of:
- a target power value for a physical uplink shared channel ($P_{O\_PUSCH}$),
- a target power value for a physical uplink control channel ($P_{O\_PUCCH}$), or
- a target power value for a sounding reference signal ($P_{O\_SRS}$), and wherein the closed-loop power control parameter comprises at least one of:
- a modulation and coding scheme (MCS) incremental parameter ($\Delta_{TF}$),
- a terminal closed-loop power control adjustment parameter ($f_c$), or
- a parameter indicating whether to use an accumulated mode.

4. The power control method of claim 2, wherein configuring the power control parameters further comprises configuring, by the network-side device, a same power control parameter for a plurality of subframes of the UE when the target subframe set to which the subframe of the UE belongs is the second subframe set.

5. The power control method of claim 2, wherein before allocating the subframe to the first subframe set, the power control method further comprises determining, by the network-side device, an interference level of a subframe of the UE according to an interference type of mutual interference between the target cell and the neighboring cell, and wherein configuring the power control parameters comprising determining, by the network-side device according to the interference level of the subframe of the UE on the flexible time-frequency resource, power control parameters corresponding to different interference levels.

6. The power control method of claim 2, wherein configuring the power control parameters comprises:
- configuring, by the network-side device, a first power control parameter for the first subframe set; and
- configuring, by the network-side device, a second power control parameter for the second subframe set, the first power control parameter and the second power control parameter being different power control parameters.

7. A power control method, comprising:
- obtaining, by a user equipment (UE) from a network-side device, power control parameters corresponding to different target subframe sets on a flexible time-frequency resource of a target cell and at least one neighboring cell, wherein the flexible time-frequency resource comprises a time domain resource having a configurable transmission direction or a frequency domain resource having a configurable transmission direction, wherein the different target subframe sets comprise a first subframe set that include one or more subframes having an uplink transmission direction in the target cell and a not uniformly uplink transmission direction in the neighboring cell, and wherein a power control parameter of the first subframe set is configured according to each subframe index; and
- transmitting, by the UE, data in subframes in the different target subframe sets according to the power control parameters.

8. The power control method of claim 7, wherein the different target subframe sets further comprise a second subframe set including a subframe with a uniformly uplink transmission direction in the target cell and the neighboring cell.

9. The power control method of claim 8, wherein when a target subframe set to which a subframe of the UE belongs is the first subframe set, obtaining the power control parameters comprises determining, by the UE according to a subframe subset to which the subframe of the UE belongs, a power control parameter from the network-side device for the UE.

10. The power control method of claim 8, wherein obtaining the power control parameters comprises:
- determining, by the UE, whether the target subframe set to which a subframe of the UE belongs is the first subframe set or the second subframe set;
- determining, by the UE, that the network-side device configures a first power control parameter for the UE when the target subframe set to which the subframe of the UE belongs is the first subframe set; and
- determining, by the UE, that the network-side device configures a second power control parameter for the UE when the target subframe set to which the subframe of the UE belongs is the second subframe set.

11. The power control method of claim 7, wherein obtaining the power control parameters comprises:
- determining, by the UE according to a subframe index of a subframe of the UE, a power control parameter from the network-side device for the UE; and
- determining, by the UE according to an interference level of the subframe of the UE, the power control parameter from the network-side device for the UE.

12. The power control method of claim 7, wherein a power control parameter comprises an open-loop power control parameter and a closed-loop power control parameter, the open-loop power control parameter comprising at least one of:
- a target power value for a physical uplink shared channel ($P_{O\_PUSCH}$),
- a target power value for a physical uplink control channel ($P_{O\_PUCCH}$), or
- a target power value for a sounding reference signal ($P_{O\_SRS}$), and wherein the closed-loop power control parameter comprises at least one of:
- a modulation and coding scheme (MCS) incremental parameter ($\Delta_{TF}$),
- a terminal closed-loop power control adjustment parameter ($f_c$), or
- a parameter indicating whether to use an accumulated mode.

13. The power control method of claim 7, wherein when the UE determines to use an accumulated mode in the subframes in the different target subframe sets, obtaining the power control parameters comprises calculating, by the UE according to a power control parameter used in a previous subframe in a corresponding same target subframe set, a power control parameter used by the UE in a current subframe.

14. The power control method of claim 7, wherein the flexible time-frequency resource comprises at least one of a flexible frequency band, a flexible subband, a flexible subframe, a flexible frame, or a flexible superframe.

15. The power control method of claim 7, wherein a power control parameter comprises an open-loop power control parameter, the open-loop power control parameter comprising at least one of:
- a target power value for a physical uplink shared channel ($P_{O\_PUSCH}$),
- a target power value for a physical uplink control channel ($P_{O\_PUCCH}$), or
- a target power value for a sounding reference signal ($P_{O\_SRS}$).

16. The power control method of claim 7, wherein a power control parameter comprises a closed-loop power control parameter, the closed-loop power control parameter comprising at least one of:
- a modulation and coding scheme (MCS) incremental parameter ($\Delta_{TF}$),
- a terminal closed-loop power control adjustment parameter ($f_c$),
- a parameter indicating whether to use an accumulated mode.

17. The power control method of claim 7, wherein when the UE determines to use an accumulated mode in the subframes in the different target subframe sets, obtaining the power control parameters comprises calculating, by the UE according to a power control parameter used in a previous subframe in a same subframe subset in a corresponding same target subframe set, a power control parameter used by the UE in a current subframe.

18. A power control method, comprising:
- obtaining, by a network-side device, at least two target subframe sets on a flexible time-frequency resource of a target cell and at least one neighboring cell, wherein the flexible time-frequency resource comprises a time domain resource having a configurable transmission direction or a frequency domain resource having a configurable transmission direction, and wherein the target subframe sets comprise a first subframe set;
- configuring, by the network-side device, power control parameters respectively corresponding to different target subframe sets to enable a user equipment (UE) to transmit data in subframes of the target subframe sets according to the power control parameters, wherein the first subframe set includes one or more subframes having an uplink transmission direction in the target cell and a not uniformly uplink transmission direction in the neighboring cell; and
- dividing, by the network-side device, the first subframe set into a plurality of subframe subsets, wherein each subframe subset has an equal quantity of downlink or uplink transmission direction in the neighboring cell, and wherein a power control parameter of the first subframe set is configured according to each subframe subset index or an attribute identifier of each subframe sub set.

19. The power control method of claim 18, wherein before obtaining the target subframe sets, the power control method further comprises allocating, by the network-side device, a subframe having an uplink transmission direction in the target cell and a not uniformly uplink transmission direction in the neighboring cell to the first subframe set and a subframe having a uniformly uplink transmission direction in the target cell and the neighboring cell to a second subframe set of the target subframe sets.

20. The power control method of claim 19, wherein configuring the power control parameters further comprises configuring, by the network-side device, a same power control parameter for a plurality of subframes of the UE when the target subframe set to which the subframe of the UE belongs is the second subframe set.

21. The power control method of claim 18, wherein a power control parameter comprises an open-loop power control parameter, the open-loop power control parameter comprising at least one of:
- a target power value for a physical uplink shared channel ($P_{O\_PUSCH}$),
- a target power value for a physical uplink control channel ($P_{O\_PUCCH}$), or
- a target power value for a sounding reference signal ($P_{O\_SRS}$).

22. The power control method of claim 18, wherein a power control parameter comprises a closed-loop power control parameter, the closed-loop power control parameter comprising at least one of:
- a modulation and coding scheme (MCS) incremental parameter ($\Delta_{TF}$),
- a terminal closed-loop power control adjustment parameter ($f_c$), or
- a parameter indicating whether to use an accumulated mode.

* * * * *